United States Patent
Erignac

(10) Patent No.: US 8,656,392 B2
(45) Date of Patent: Feb. 18, 2014

(54) CONSENSUS BASED DISTRIBUTED TASK EXECUTION

(75) Inventor: Charles A. Erignac, Seattle, WA (US)

(73) Assignee: The Boeing Company, Chicago, IL (US)

(*) Notice: Subject to any disclaimer, the term of this patent is extended or adjusted under 35 U.S.C. 154(b) by 922 days.

(21) Appl. No.: 12/482,318

(22) Filed: Jun. 10, 2009

(65) Prior Publication Data
US 2010/0319005 A1    Dec. 16, 2010

(51) Int. Cl.
*G06F 9/46*    (2006.01)

(52) U.S. Cl.
USPC ........... 718/100; 718/101; 718/106; 719/315; 719/318

(58) Field of Classification Search
None
See application file for complete search history.

(56) References Cited

U.S. PATENT DOCUMENTS

| | | | | |
|---|---|---|---|---|
| 4,333,144 A * | 6/1982 | Whiteside et al. | ............ | 718/102 |
| 4,733,353 A * | 3/1988 | Jaswa | ............ | 713/375 |
| 4,980,824 A * | 12/1990 | Tulpule et al. | ............ | 718/106 |
| 5,261,085 A * | 11/1993 | Lamport | ............ | 714/4.1 |
| 5,349,654 A * | 9/1994 | Bond et al. | ............ | 714/45 |
| 5,513,354 A * | 4/1996 | Dwork et al. | ............ | 718/106 |
| 5,546,584 A * | 8/1996 | Lundin et al. | ............ | 719/315 |
| 5,742,753 A * | 4/1998 | Nordsieck et al. | ............ | 714/11 |
| 5,761,412 A * | 6/1998 | Higgins | ............ | 714/4.1 |
| 6,178,522 B1 * | 1/2001 | Zhou et al. | ............ | 714/12 |
| 2003/0177187 A1 * | 9/2003 | Levine et al. | ............ | 709/205 |
| 2005/0028021 A1 * | 2/2005 | English | ............ | 714/1 |
| 2005/0114854 A1 * | 5/2005 | Padisetty et al. | ............ | 718/1 |
| 2005/0149609 A1 * | 7/2005 | Lamport | ............ | 709/200 |
| 2006/0005205 A1 * | 1/2006 | Illowsky et al. | ............ | 719/315 |
| 2006/0080678 A1 * | 4/2006 | Bailey et al. | ............ | 719/325 |
| 2009/0265640 A1 * | 10/2009 | Abernethy et al. | ............ | 715/751 |

OTHER PUBLICATIONS

Saito et al., Optimistic Replication, (48 pgs), ACM Computing Surveys, vol. 37, No. 1, Mar. 2005.
Stone et al., Task Decomposition, Dynamic Role Assignment, and Low-Bandwidth Communication for Real-Time Strategic Teamwork, Artificial Intelligence, Jun. 1999, (29 pgs).
Helsinger et al., Cougaar: A Scalable, Distributed Multi-Agent Architecture, 2004 IEEE, (8 pgs).
Proceedings of 'i-SAIRAS 2005'—The 8th International Symposium on Artificial Intelligence, Robotics and Automation in Space, Sep. 2005, ESTEC, Munich, Germany (15 pgs).
Clement et al., Continual Coordination Through Shared Activities, XP002599564, www.ai.jpl.nasa.gov/public/planning, Jul. 18, 2003, (8 pgs).
Wei Ren et al., A Survey of Consensus Problems in Multi-Agent Coordination, Proceedings of the 2005 American Control Conference, IEEE vol. 3, Jun. 2005, (6 pgs).

(Continued)

*Primary Examiner* — Hyung Sough
*Assistant Examiner* — Shih-Wei Kraft
(74) *Attorney, Agent, or Firm* — Toler Law Group, PC

(57) ABSTRACT

Computer-implemented methods, systems, and computer-readable storage media are disclosed to coordinate a plurality of devices in performing a task. A particular computer-implemented method includes storing updated status information at a device where the updated status information reflects a change in a vote for a task state of one or more of a plurality of devices. A first updated status message is sent to one or more of the plurality of devices where the first updated status message communicates the updated status information. A task consensus at the device is updated when the updated status information indicates that at least a predetermined quantity of the plurality of devices agrees on the task status.

19 Claims, 20 Drawing Sheets

(56) References Cited

OTHER PUBLICATIONS

Hariri et al., Architectural Support for Designing Fault-Tolerant Open Distributed Systems, Computer USA, vol. 25, No. 6, Jun. 1992, (13 pgs).

International Search Report and Written Opinion of the International Searching Authority, International Application No. PCT/US2010/034757, European Patent Office, Sep. 21, 2010, (13 pgs).

Cox et al., Optimistic Replication Using Vector Time Pairs, 2004 (16 pgs).

Clement et al., Shared Activity Coordination, Jet Propulsion Laboratory, California Institute of Technology, Jul. 2003 (9 pgs).

Saito et al., Optimistic Replication, Mar. 2005, ACM Computing Surveys (48 pgs).

\* cited by examiner

CONSENSUS BASED DISTRIBUTED TASK EXECUTION

FIELD OF THE DISCLOSURE

The present disclosure is generally related to coordinating a plurality of agents or devices in performing tasks.

BACKGROUND

Autonomous agents, such as robots, robotic vehicles, or software agents, may coordinate the performance of shared or interdependent tasks through a central node. The central node communicates with each of the autonomous agents to determine the status of each of the autonomous agents to determine when the autonomous agents are prepared to perform a task and then communicates with each of the autonomous agents to initiate a next action. The central node acts as a central "blackboard" where each of the autonomous agents can post its status and review the status of the other autonomous agents.

Reliance on a central node presents certain disadvantages. For example, because each of the autonomous agents is dependent upon the central node for communication, if the central node fails, the autonomous agents may not be able to perform tasks. As another example, reliance on a central node may limit scalability of a system because a central node may only be able to reasonably maintain communication with a limited number of autonomous agents before communications interference or contention results in inefficient operations. Similarly, if each of the autonomous agents must maintain communications with the central node, the transmissions range of the central node may limit the size of the area in which the autonomous agents can perform shared or interdependent tasks.

Distributed systems in which autonomous agents may act independently of a central node resolve some of these concerns. However, even if the autonomous agents may act without reliance on a central node, if each of the autonomous agents must confer with every other autonomous agents to determine the status of the other autonomous agents these restrictions may limit system scalability and area coverage.

SUMMARY

Embodiments disclosed herein include computer-implemented methods, systems, and computer-readable storage media for coordinating a plurality of devices in performing a task. According to an illustrative embodiment, a plurality of devices, robotic agents, or other agents communicate using peer to peer communication rather than by coordinating their actions using a central node. Each of the agents maintains local status information including its own task status and the status of one or more peer agents. When an agent updates its own task status or receives a message indicating a change in the task status of one of the peer agents, the local status information is updated and a message is sent to the one or more peers to share the most recent status information known at the agent. Each of the agents keeps track of the state of a task over time by processing the messages received from its peers and locally updating the state of this task if it is involved in its execution. The consensus on the task status of the agents is a general agreement on the state of the task at a given time. A consensus may exist when all of the agents have reached the same task state, when all of the active agents have reached the same task status, or when a predetermined number or portion of the agents or active agents have reached a same status. Upon determining that the consensus exists, the agents may proceed to a next action.

In one illustrative embodiment of a computer-implemented method, updated status information is stored at a device. The updated status information reflects a change in a vote for a task state of one or more of a plurality of devices. A first updated status message is sent to one or more of the plurality of devices. The first updated status message communicates the updated status information. A task consensus at the device is updated when the updated status information indicates that a predetermined quantity of the plurality of devices agree on the task status.

In another illustrative embodiment, a system for controlling a robotic agent includes a task controller to control a robotic agent in performing an assigned role of a task. The task controller initiates performance of the assigned role and reports completion of the performance of the assigned role. The system also includes a status manager to communicate with the task controller and to update status information stored at the robotic agent. The status information includes a vote for the task state for the robotic agent and for each of the one or more peer robotic agents. The system also includes a peer to peer communications system to communicate with the status manager. The peer to peer communication system receives a first status message from at least one of the one or more peer robotic agents. The first status message includes peer status information reported by one of the one or more peer robotic agents. The system sends a second status message to the one or more peer robotic agents. The second status includes the local status information stored at the robotic agent.

In yet another illustrative embodiment, a computer-readable storage medium stores instructions executable by a computer system. The computer-readable storage medium stores instructions to store status information indicating a vote for a task state of each of a local agent and one or more peer agents associated with a task. The computer-readable storage medium stores instructions executable by the computer system to identify a change in the task status of the local agent or of at least one of the one or more peer agents. The computer-readable storage medium stores instructions executable by the computer system to update the status information to reflect the change in the task status. The computer-readable storage medium stores instructions executable by the computer system to transmit a status message to send the updated status information to one or more of the one or more peer agents. The computer-readable storage medium also stores instructions executable by the computer system to determine a task consensus based on whether the status information indicates that a specified quantity of agents agree on the task status.

The features, functions, and advantages that have been described can be achieved independently in various embodiments or may be combined in yet other embodiments, further details of which are disclosed with reference to the following description and drawings.

DETAILED DESCRIPTION

In accordance with particular illustrative embodiments, computer-implemented methods, systems, and computer-readable storage media are disclosed for coordinating a plurality of devices in performing one or more shared tasks. According to an illustrative embodiment, a plurality of devices, robotic agents, or other agents communicate using peer to peer communication rather than by coordinating their actions through a central node. Each of the agents maintains local status information including its own vote for a task state and the votes of one or more peer agents. When an agent updates its own vote for the task state or receives a message indicating a change in the vote of one of the peer agents, the local status information is updated and a status message is sent to the one or more peer agents to share the most recent status information.

According to one illustrative embodiment, versions of the status information are shared using optimistic replication. Thus, multiple versions of the status information may be circulating among the plurality of agents during a common time frame. Version control, such as through the use of modification and synchronization vectors, may be used to determine which of a number of circulated sets of status information is most current.

According to one particular illustrative embodiment, each of the agents monitors a consensus of votes for the task state of the agents to determine whether or how to proceed with shared or interdependent tasks. Each agent may wait until the consensus indicates agreement on the task status before proceeding to a next state. For example, the consensus may indicate agreement on the task status when all of the agents, all of the agents that are active, or a predetermined number of the agents agree on the task status. The agents also may be subject to activate, pause, and cancel control messages transmitted by an external control source. A failure in the status of any of the agents may end execution of one or more of the shared or interdependent tasks.

Figure 1:
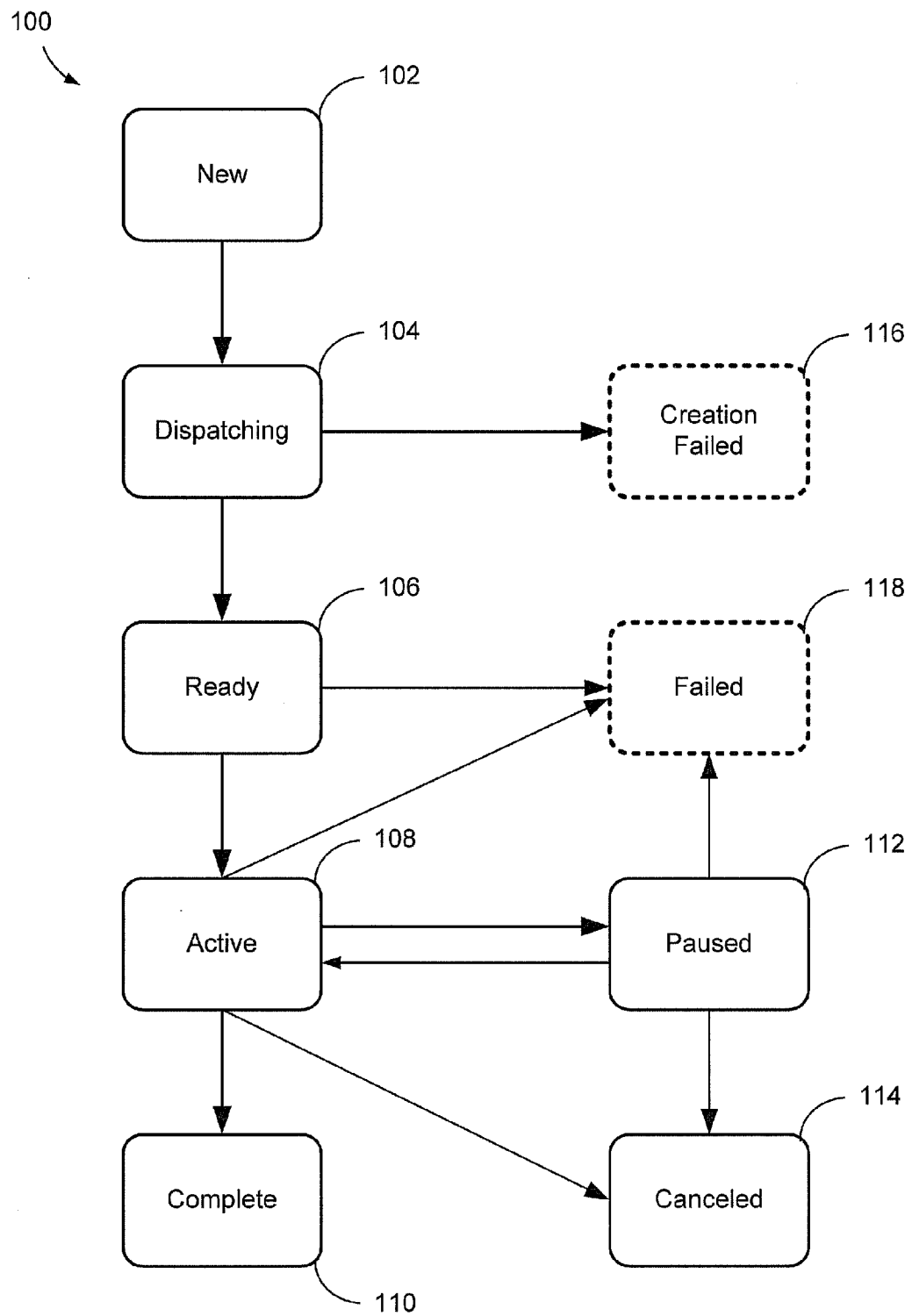
FIG. 1 is a block diagram of a finite state machine used by agents in an illustrative embodiment to coordinate a plurality of agent devices in performing a task.

FIG. 1 is a block diagram of a finite state machine 100 used by agents in coordinating a plurality of agents in performing a task. This finite state machine represents the life-cycle of a task for the purpose of coordinating and monitoring its execution. Additional domain-specific data may be associated with a task to fully define it. For example, additional information may include a door that a robotic agent is to open, or a minimum or maximum duration during which performance is to occur. According to an illustrative embodiment, each of the plurality of agents or plurality of devices joined in performing a shared task maintains a local copy of the finite state machine 100 for the shared task to maintain a consistent status path for each of the agents.

The consensus is maintained by allowing each agent taking part in a shared task to vote on the next state of the task. That is the state the task should transition to according to this agent. Each agent concurrently transitions the finite state machine to a next state when a consensus on the next state emerges. An agent shares its vote with the other agents through peer-to-peer communication. The vote is contained in a task status message that also contains the most recent votes cast by other participating agent that were received by this agent. Versioning information, such as a version vector is included in the status message to allow receiving agents to merge the content of the message with their current task status so that, when. After receiving status message, each agent tallies the votes, i.e. computes the consensus. If the consensus is to transition to a new state, the agent updates the state of its finite state machine replica accordingly. Tie breaking rules are defined below for specific situations. Monitoring agents, agents that to not participate in the task, perform the same algorithm, but do not cast votes. The monitoring agents may operate to relay status messages. According to a particular embodiment, the monitoring agents may determine whether status messages relay more current status information and then merge updated information with the existing status information. By transmitting only status information that is determined to be current, monitoring agents and other agents may prevent other agents from having to process status messages that are out of date. Examples of how agents vote on a task state, share status messages, and reach a consensus to advance to different task states are described below with reference to FIGS. 4-17.

The finite state machine 100 includes six normal states. The normal states include states that each of the agents participating in a shared task may enter during the course of performing a task. The six normal states include: a new state 102, a dispatching state 104, a ready state 106, an active state 108, a complete state 110, a paused or suspended state 112, and a canceled state 114. The finite state machine 100 also includes two error states. Agents may enter into the error states when a system failure or some other condition causes one or more of the agents to be unable to successfully perform their roles in the shared task. The two error states include a creation failed state 116 and a failed state 118.

The new state 102 represents an initial state of each task when the task is created in the agent. An agent automatically enters the dispatching state 104 when the task is distributed to the agent. According to a particular illustrative embodiment, the task is distributed to each of the agents participating in the task or subscribing to the task by distributing a replica of the finite state machine 100 to each of the agents. Even though an agent may not participate in a particular task, that agent may monitor the performance of the task as a prerequisite to some other task the agents will monitor or perform.

Because the agents participating in a shared task vote on when to transition to a next state, the finite state machine is described from a collective point of view. The ready state 106 signifies that the participating agents are ready to perform their assigned roles in the task. An active state 108 signifies that the agents are in the process of performing their assigned role in the task. According to an illustrative embodiment described further below, an agent may progress from the ready state 106 to the active state 108 automatically when all of the agents participating in a shared task have voted for the ready state 106. An agent also may vote to proceed from the ready state 106 to the active state 108 when a prerequisite task to be performed by one or more other agents has been completed. Alternatively, according to another illustrative embodiment, an agent may vote to progress from the ready state 106 to the active state 108 only in response to receiving a signal from an external control source (not shown in FIG. 1). The external control source may signal a transition to the active state 108 based on a consensus of a plurality of agents or based on another condition, such as data from an external source or a human control decision. A complete state 110 indicates that all the participating agent have completed their role in the task.

The normal states of the finite state machine 100 also may include a paused state 112 or a canceled state 114. Either of the paused state 112 or the canceled state 114 may be initiated by an external control source when the task is in the active state 108. For example, the external control source may send a pause signal to transition the task from the active state 108 to the paused state 112. According to a particular illustrative embodiment, the signal is to be received from by every participating agent to form a consensus to perform the transition to pause state 112. The external control source also may send a resume signal for the agents to vote to transition from the paused state 112 back to the active state 108. Alternatively, the external control source may send a cancellation signal causing the agent to vote to transition to a canceled state 114, thereby canceling the task. The task may be transitioned to the canceled state 114 from either the active state 108 or from the paused state 112.

A first of the two error states is the creation failed state 116. The creation failed state 116 may represent an inability of the agent to successfully generate a replica of the finite state machine 100 for the task or to otherwise receive the additional instructions to be used in performing the task. According to an illustrative embodiment, the can agent vote to transition to the creation failed state 116 only from the dispatching state 104. A second of the two error states is the failed state 118. The agent may vote to transition to the failed state 118 when the agent is unable to perform its assigned role in the task. For example, the agent may transition to the failed state 118 as a result of hardware or software failures, in response to encountering a condition that the agent cannot overcome, or upon facing any circumstance that prevents the agent from performing its assigned role. The agent also may transition to the failed state 118 upon the failure of another agent involved in the performance of the task. According to an illustrative embodiment, as a tie breaking rule, votes for failure states override votes for regular states and force the consensus to the selected failure state. As described further below, receiving status information indicating that a peer agent or peer device has failed may trump a ready state 106 or an active state 108 or a paused state 112 registered by the agent so that the consensus may not reflect a completed task when one of the assigned agents has failed to fulfill its part of the task.

In a particular illustrative embodiment, each agent that participates in a shared task maintains an independent copy of the finite state machine 100 for the shared task. For example, an agent may vote to enter a ready state 106 independently of the state of any of the other peer agents or peer devices. However, whether the agent will act on a particular state may depend on a consensus of the agent and the other agents participating in the task. In other words, the agent may vote to assume a ready state 106 even though some or none of the peer agents may have yet concurred and communicated a vote for ready state 106. Thus, even though the agent votes to take the ready state 106, the consensus of the participating agents may not be the ready state 106, and neither the agent nor the peer agents will act as though the agents have agreed upon a ready state 106.

Figure 2:
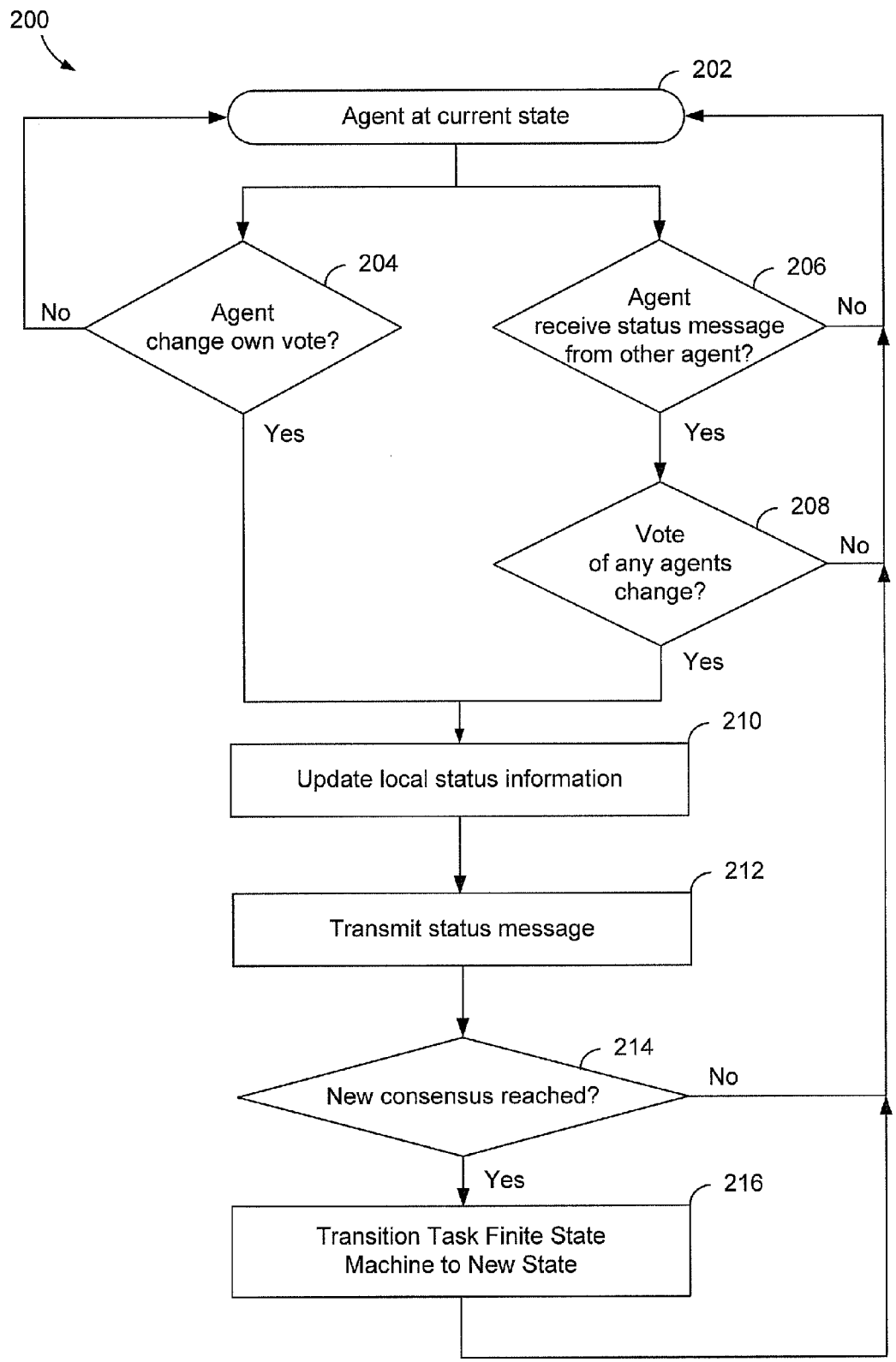
FIG. 2 is a flow diagram of a particular embodiment of a method by which an agent updates locally-maintained consensus and status information in response to a change in a state of the agent or a change of state of another agent.

FIG. 2 is a flow diagram of a particular embodiment of a method 200 by which an agent updates locally-maintained consensus and status information in response to a change in a state of the agent or a change of state of another agent. The agent is one of a plurality of agents. The agent maintains status information that includes votes from the local agent and votes from all other agents participating in a shared task. The agent uses the status information to determine a consensus of the agents participating in the shared task to determine when to transition to a next task state. When the agent changes its vote to move to a new task state (e.g., when completing a task, the agent will change its vote from active to completed, as described with reference to FIG. 1), the agent updates local status information it maintains to determine the consensus. Alternatively, when the agent receives status information from another agent that reports a different vote for one or more others agents than is reflected in the local status information, the agent updates local status information. When the local status information changes, the agent transmits or broadcasts the updated local status information.

The method 200 begins with the agent at a current state 202, such as a current state in the task finite state machine 100 (FIG. 1). It is determined if the agent changes its own vote, at 204. If not, the method 200 returns to 202 where it continues to monitor for a change in the vote of the local agent. On the other hand, if it is determined that the agent does change its vote, at 204, the agent updates the local status information, at 210. In parallel, from the current state 202, it is determined if the agent receives a status message from another agent, at 206. If not, the method 200 returns to 202 where it continues to monitor for a change in the vote of the local agent or for receipt of a status message from another agent. On the other hand, if it is determined that the agent receives a status message from another agent, at 206, the agent determines if a vote of any of the agents represented in the status message has changed from the votes represented in the local status information, at 208. If not, the method 200 returns to 202 monitor for a change in the vote of the local agent or for receipt of a status message from another agent. On the other hand, if it is determined that the vote of any of the agents has changed, at 208, the agent updates the local status information, at 210. Versioning control, through the use of a version vector or other process, may be used to determine that the status information represented in the received status message is current or at least more current than the status information maintained by the agent.

After updating the local status information to represent the changed vote or votes, at 210, the agent transmits a status message to broadcast the updated status information, at 212. The agent determines if a new consensus has been reached as a result of the updated status information, at 214. If no new consensus is reached, the method returns to the current state 202 to monitor for changes in votes that may change the local status information. On the other hand, if it is determined that a new consensus is reached, at 214, the agent transitions to a new state, such as a next state indicated by the a task finite state machine 100 (FIG. 1), at 216.

Examples of changing votes, sharing of status information, and determining when a new consensus is reached are illustrated in the block diagrams of FIGS. 4-17, which depict examples of a plurality of agents executing shared or interdependent tasks. The tasks are part of a shared plan described with reference to FIG. 3.

Figure 3:
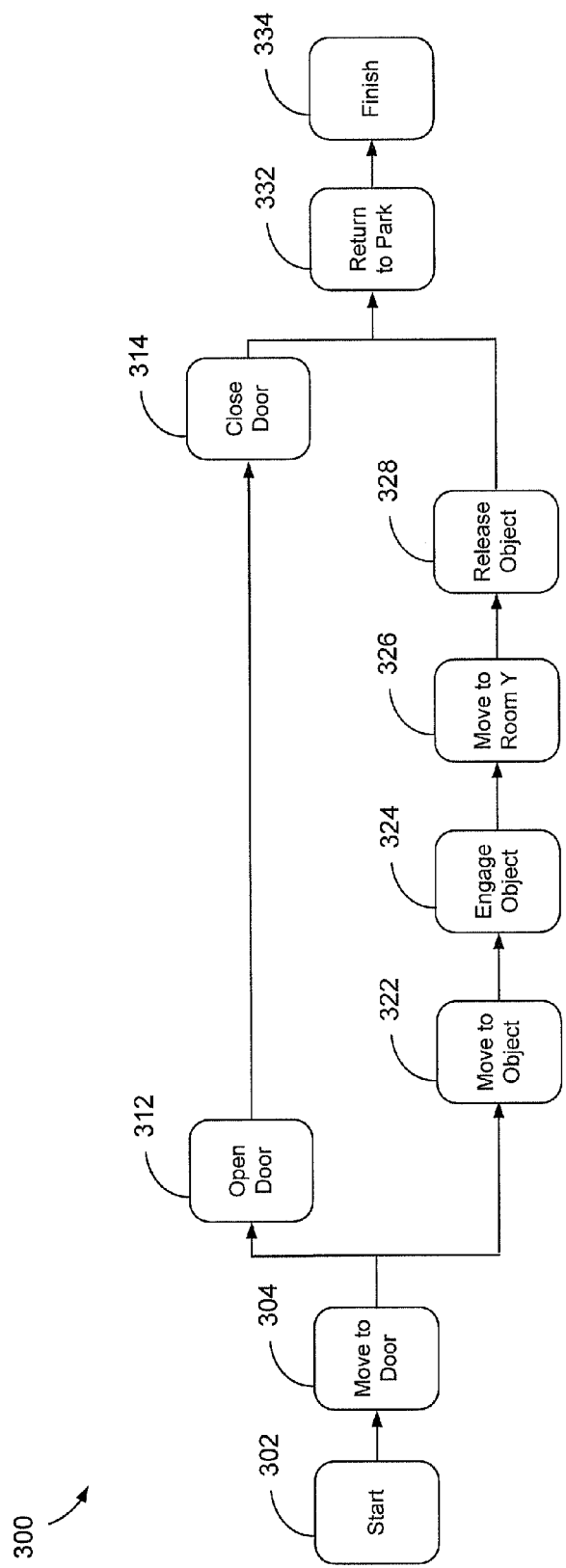
FIG. 3 is a block diagram of a particular embodiment of a shared plan including tasks to be performed by a plurality of agent devices.

FIG. 3 is a block diagram of a shared plan 300 in which a plurality of agents perform tasks including a plurality of shared tasks according to an illustrative embodiment of coordinating a plurality of agents in performing a task. The shared plan 300 includes a plurality of tasks. Execution of some of the tasks in the shared plan 300 is described with reference to FIGS. 4-17. The shared plan 300 illustrates a series of tasks using multiple agents to move an object from one of the rooms to another room. For purposes of illustration, Agent A will be tasked with operating a door while two other agents, Agent B and Agent C, will move the object between the two rooms, from Room X to Room Y. After the object has been moved, Agent A closes the door, and the shared plan 300 is complete.

To execute the shared plan 300, some of the tasks may be performed by all of the agents joined in the shared plan 300, including a move to door task 304 and a return to park task 332. Other tasks, such as an open door task 312 and a close door task 314 may be performed only by a single agent. These are individual, solo tasks that are not joint or shared tasks in which other agents will participate. Nonetheless, the other agents may monitor performance of individual tasks assigned to other agents. For example, the agents tasked with moving the object from room to room may subscribed to the individual task or tasks of the operating the door to be informed of when the door is open.

In the example of FIGS. 4-17, the tasks involved in moving the object are shared tasks. That is, a plurality of agents including Agent B 414 and Agent C 416 will be joined and will act in concert. The agents may agree on a shared status to successfully perform their tasks. The tasks to be performed by the agents that move the object also are subscribed to by the door-operating agent, Agent A 412, so that Agent A 412 is informed of when it can close the door.

Referring to FIG. 3, after a start task 302, the agents all move to an initial position by the door as part of a shared move to door task 304. A first agent (or a plurality of first agents if the task calls for more than one agent) performs the open door task 312. Once the door has been opened by the first agent, a plurality of second agents performs a number of shared tasks. The shared tasks include a move to object task 322, an engage object task 324, a move to Room Y task 326, and a release object task 328. When the first agent determines that the plurality of second agents has completed the shared tasks 322-228, the first agent performs a close door task 314. All of the agents then perform shared tasks of return to park 332 and finish 334.

Figure 4:
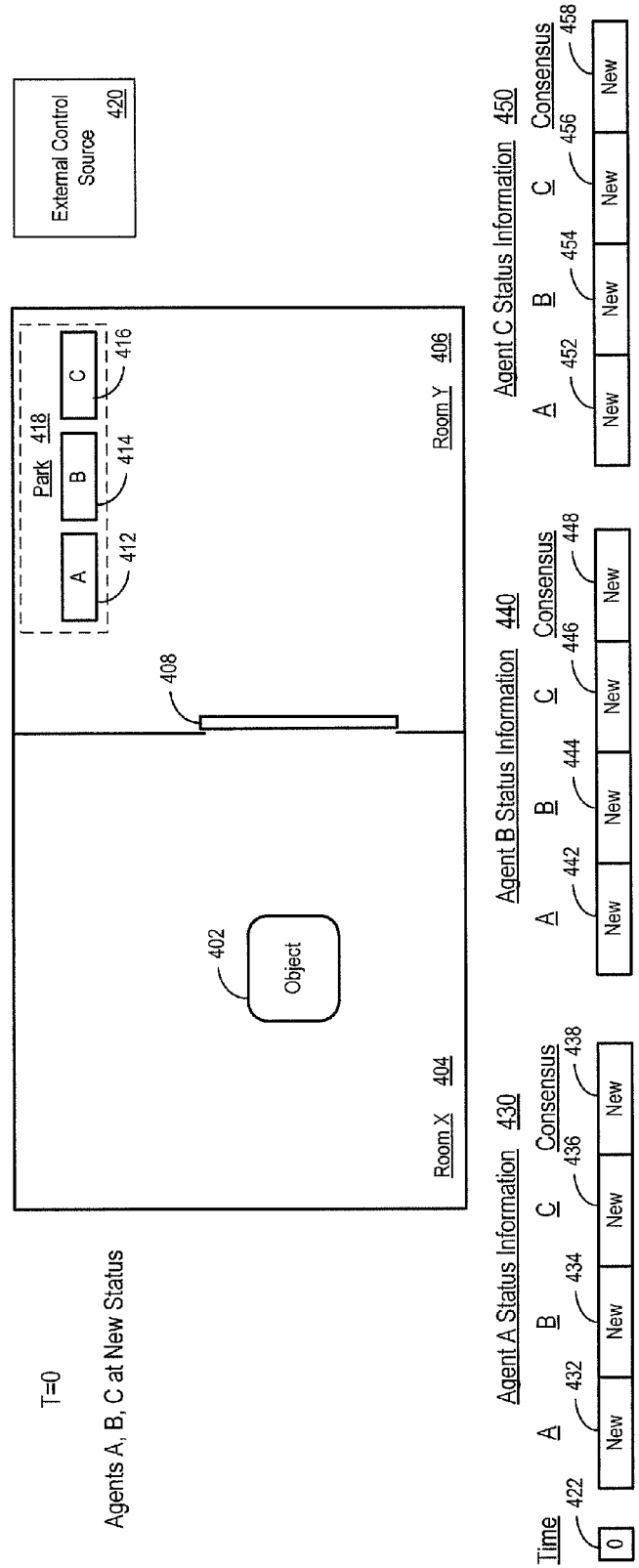
FIGS. 4-17 are block diagrams to illustrate a plurality of agents performing a plurality of shared and unshared tasks according to an illustrative embodiment of systems and method of coordinating a plurality of devices in performing a task.

FIGS. 4-17 are block diagrams of a plurality of agents performing a plurality of shared and unshared tasks according to illustrative embodiments of coordinating a plurality of devices in performing a task. Performance of shared and unshared tasks includes the performance of some of the shared and unshared tasks described with reference to the shared plan 300 of FIG. 3. In the examples of FIGS. 4-17, as shown in FIG. 4, when the shared plan is initiated, an Agent A 412, an Agent B 414, and an Agent C 416 all are located in a parking area 418 in Room Y 406. An object 402 is located in Room X 404. A door 408 between Room X 404 and Room Y 406 is to be opened by Agent A 412 (e.g., in an open door task 312 as shown in FIG. 3) to enable Agent B 414 and Agent C 416 to move the object 402 from Room X 404 to Room Y 406. At points during the performance of the tasks, an External Control Source 420 may send messages to Agent A 412, Agent B 414, and Agent C 416 to initiate or halt performance of portions of some of the tasks.

FIG. 4 illustrates an initial state of Agent A 412, Agent B 414, and Agent C 416 at a time T=0 422. At the time T=0 422, each of Agent A 412, Agent B 414, and Agent C 416 have entered a "new" state. Starting from the new state, each of the agents proceeds to perform an assigned role in the shared task of moving to the door 408. FIG. 4 shows status information 430, 440, and 450 maintained by each of Agent A 412, Agent B 414, and Agent C 416, respectively, in the performance of the shared plan. The Agent A status information 430 includes a vote of Agent A 432, a vote of Agent B 434, a vote of Agent C 436, and a consensus 438. The consensus 438 is derived by Agent A 412 from the vote of Agent A 432, the vote of Agent B 434, and the vote of Agent C 436. The vote of each of the agents 412-416 represents a consensus determined by each of the agents based on the status information 430, 440, 450, respectively, maintained by each of the agents 412-416. In a particular illustrative embodiment, the consensus 438 may represent a unanimous consensus of the state of the agents 412, 414, and 416. Other forms of consensus are described below with reference to FIG. 5.

The consensus 438 for Agent A 412 is determined locally based on the vote of Agent A 432, the vote of Agent B 434, and the vote of Agent C 436 included in the Agent A status information 430. Agent B 414 and Agent C 416 similarly maintain local status information regarding the agents 412-416 participating in the shared plan. For example, the Agent B status information 440 includes a vote of Agent A 442, a vote of Agent B 444, a vote of Agent C 446, and a consensus 448 that indicates the last agreed upon state of all of the agents 412-416 included in the Agent B status information 440. The Agent C status information 450 may include a vote of Agent A 452, a vote of Agent B 454, a vote of Agent C 456, and a consensus 458 that indicates the last agreed upon state of all of the agents 412-416 included in the Agent C status information 450.

According to an illustrative embodiment, the status information 430, 440, 450 maintained by each of the agents 412-416 is transmitted to other agents 412-416 using peer to peer communication whenever the status information 430, 440, 450 changes. When one of the agents 412-416 updates its own state, it updates its status information and transmits the status information to the other agents 412-416. Also, when one of the agents 412-416 receives status information from another of the agents 412-416 that changes the status of one or more agents 412-416, the agent updates its status information and then transmits a status message to relay the updated status information to the other agents 412-416. As described further below, multiple status messages carrying different sets of status information 430, 440, 450 may be transmitted at once using optimistic replication. Some of the status information 430, 440, 450 may be more current and issued more recently than other information. Synchronization and modification vectors or another type of versioning control may be used to ensure that each of the agents 412-416 identifies and responds to current status information.

In FIG. 4, the vote of each of the agents, as communicated to the other agents 412-416, is a "new" state. For example, the Agent A status information 430 shows the vote of Agent A 432 is new, the vote of Agent B 434 is new, and the vote of Agent C 436 is new. Because all the agents 412-416 agree on the new state, the consensus 438 is also the new state. Similarly, the Agent B status information 440 shows the vote of Agent A 442 is new, the vote of Agent B 444 is new, and the vote of Agent C 446 is new, thus, the consensus 448 is new. The Agent C status information 450 shows the vote of Agent A 452 is new, the vote of Agent B 454 is new, and the vote of Agent C 446 is new, thus, the consensus 458 is the new state.

Figure 5:
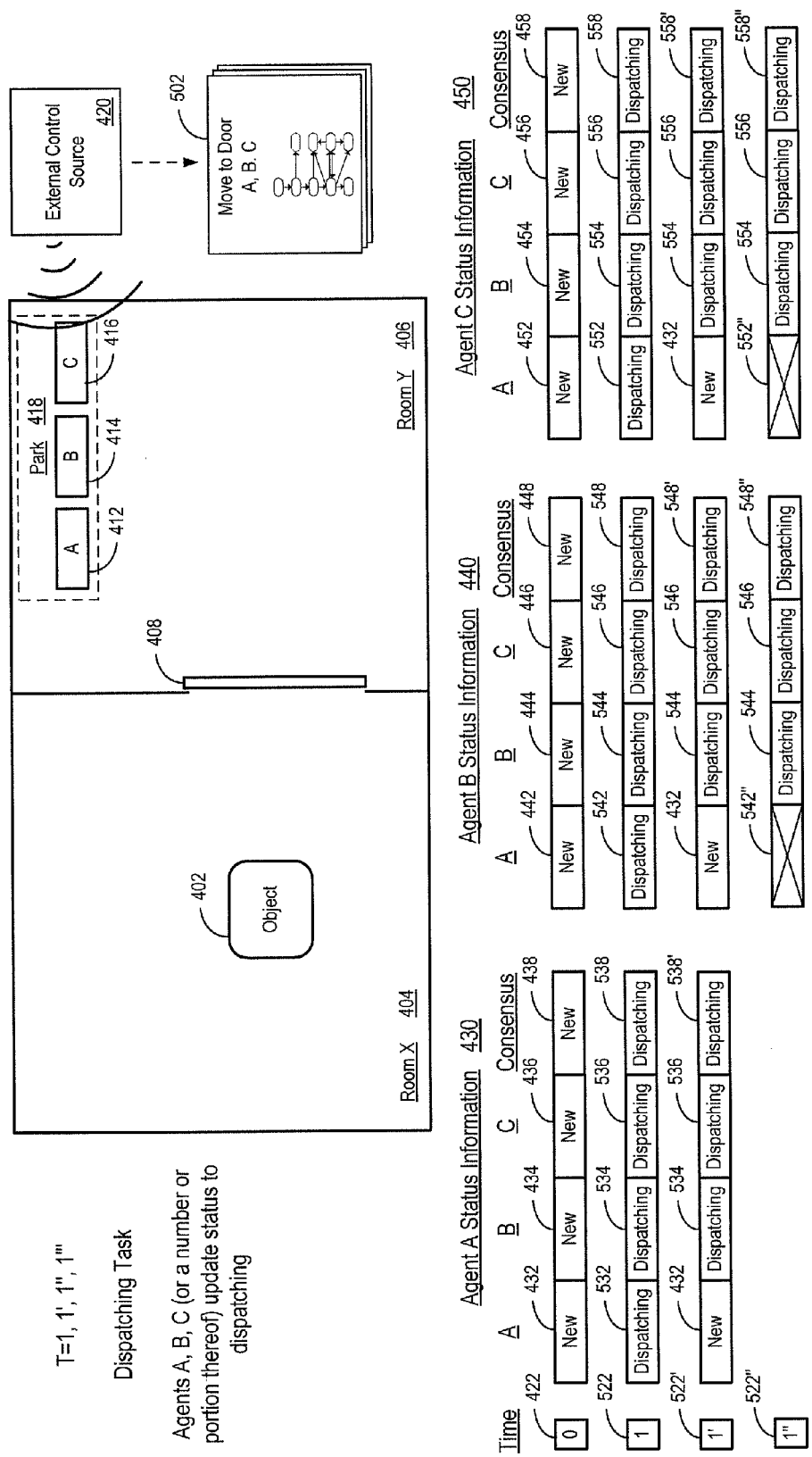

FIG. 5 is a block diagram showing each of the agents 412-416 at a time T=1 522. At the time T=1 522, replicas of a finite state machine 502 representing a task are dispatched to each of the agents from an external control source 420. Each of the agents 412-416 receives a copy of the finite state machine 502 that guides the transitions of the agents 412-416 during the performance of a task. The Agent A status information 430 shows a vote of Agent A 532 as dispatching, a vote of Agent B 534 as dispatching, and a vote of Agent C 536 as dispatching. The vote of all the agents are in agreement in the Agent A status information 430, thus, a consensus 538 associated with the Agent A status information 430 is updated to dispatching at the time T=1 522. Similarly, the Agent B status information 440 shows a vote of Agent A 542 as dispatching, a vote of Agent B 544 as dispatching, and a vote of Agent C 546 as dispatching. A consensus 548 of the Agent B status information 440 is also updated to dispatching at the time T=1 522. The Agent C status information 450 shows a state of Agent A 552 as dispatching, a vote of Agent B 554 as dispatching, and a vote of Agent C 546 as dispatching. A consensus 558 of the Agent C status information 450 is also updated to dispatching at the time T=1 522.

In a particular illustrative embodiment, the consensus 538, 548, 558 was updated to dispatching because in the status information 430, 440, and 450 showed the vote of all the agents 412-416 as dispatching at the time T=1 522. However, in another particular illustrative embodiment, the consensus 538, 548, 558 may be updated without achieving a unanimous consensus. Rather, the consensus may be updated when a predetermined number or when a predetermined portion of the agents 412-416 report an updated state. Further alternatively, the consensus may be updated when a predetermined number of active agents 412-416, when a predetermined portion of active agents 412-416, or when all of the active agents 412-416 report an updated state. Whether the agents 412-416 are active and functioning may be determined by programming the agents 412-416 to transmit a periodic "heartbeat" signal to communicate that the agents 412-416 are active. When one of the agents 412-416 fails to transmit one or more heartbeat signals, the state of the agent 412-416 that fails to report may be changed to inactive and the failed agent loses its voting right.

In a particular embodiment, a transition from new to dispatching may be automatic. In the particular embodiment, an agent will have completed the dispatching stage, and received the state machine to evaluate its state before it is able to report its status. However, to illustrate the process of task state transitions based on consensus of the task states of the agents, the example of FIGS. 4-8 shows agents 412-416 transitioning to a dispatching state based on a reaching a consensus.

For example, a consensus may be updated when a state of a predetermined number of agents, such as two of the agents 412-416, is updated. Similarly, a consensus may be updated when a state of a predetermined portion of the agents 412-416, such as a majority or two-thirds of the agents 412-416 is updated. At a time T=1' 522', as shown in the status information 430, 440, 450, the Agent A vote 432, 442, 452 has not been updated to dispatching and is reported as new. The Agent B vote 444, 454, 464 and the Agent C vote 446, 456, 466 remains updated as dispatching. Because the state of not all of the agents 412-416 is reported as dispatching, there cannot be a unanimous consensus of the agents 412-416 as dispatching. However, the agents 412-416 may be configured so that a consensus 538', 548', 558' may be updated when a predetermined number of the agents 412-416, such as two of the agents 412-416, reports an updated state. Thus, at time T'=422', because that state of two of the agents, including the Agent B vote 534, 544, 554 and the Agent C vote 536, 546, 556 is reported as dispatching, the consensus 538', 548', 558' may be updated as dispatching. The consensus 538', 548', 558' is updated even though the Agent A vote 432, 442, and 452 has not been updated.

Similarly, the agents 412-416 may be configured so that a consensus 538', 548', 558' may be updated when a predetermined portion of the agents 412-416, such as a majority of the agents 412-416 or two-thirds of the agents 412-416, reports an updated state. Thus, at time T'=422', because a majority (or two-thirds) of the Agent B vote 534, 544, 554 and the Agent C vote 536, 546, 556 is reported as dispatching, the consensus 538', 548', 558' may be updated as dispatching. The consensus 538', 548', 558' is updated even though the Agent A vote 432, 442, and 452 has not been updated.

For another example, at the time T=1" 522", Agent A 412 has become or has been classified as inactive because it has failed to register a heartbeat signal for a predetermined number of periods or a predetermined length of time. As a result, no status information is reported for Agent A 412 at the time T=1" 522". Nonetheless, Agent B 414 and Agent C 416 may be configured to permit the consensus 548", 558" to be updated even when not all the agents 412-416 are reporting. (A failure of Agent A 412 to register a heartbeat or a state is represented in FIG. 5 by an "X" presented for an Agent A vote 542", 552".)

At the time T=1" 522", the Agent B vote 544, 554 and the Agent C vote 546, 556 is reported as dispatching. As a result, the consensus 548", 558" may be updated to dispatching if Agent B 414 and Agent C 416 are configured to update the consensus 548", 558" when all agents 412-416 that are active have been updated. Alternatively, Agent B 414 and Agent C 416 may be are configured to update the consensus 548", 558" to dispatching when a predetermined number of the agents 412-416 have been updated. For example, the consensus 548", 558" may be updated to dispatching at the time T=1 522" when Agent A 414 and Agent C 416 are configured to update the consensus 548", 558" when at least two of the agents 412-416 have been updated or when at least two of the agents 412-416 that are active have been updated. Alternatively, the consensus 548", 558" may be updated to dispatching at the time T=1" 522" when Agent B 414 and Agent C 416 are configured to update the consensus 548", 558" when a predetermined portion of the agents 412-416 has been updated. For example, the consensus 548" and 558" may be updated at the time T=1" 522" when a majority of the agents 412-416 has been updated or when a majority of the agents 412-416 that are active has been updated. Alternatively, the consensus 548" and 558" also may be updated at the time T=1" 522" when two-thirds of the agents 412-416 have been updated or when two-thirds of the agents 412-416 that are active have been updated.

Thus, particular illustrative embodiments may update a consensus of the agents 412-416 when there is less than a unanimous consensus of the states of the agents 412-416. However, for purposes of the examples of FIGS. 4-17, it is assumed that the agents 412-416 update a consensus only upon identifying a unanimous consensus of the states of the agents 412-416.

Figure 6:
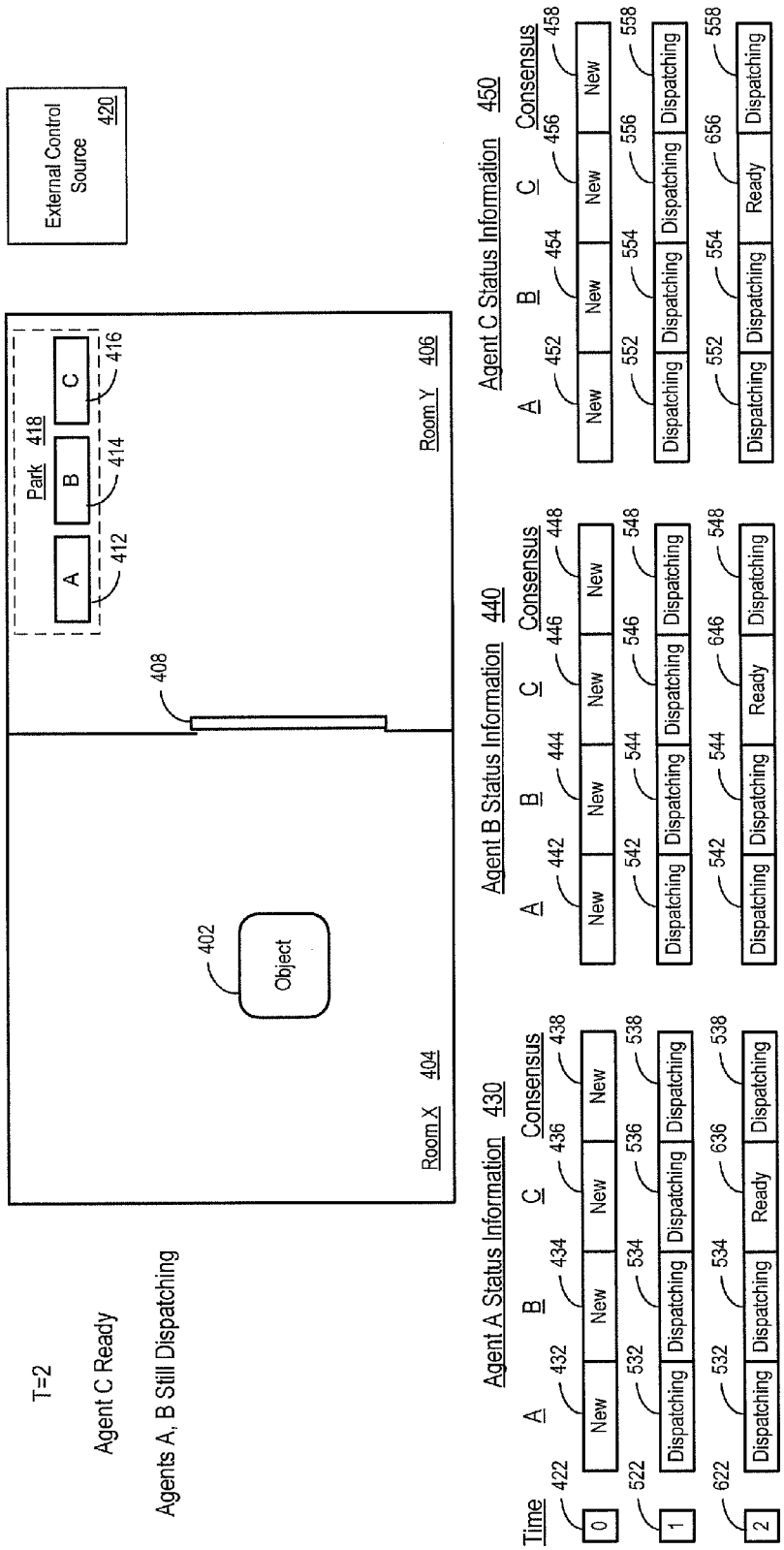

FIG. 6 is a block diagram showing each of the agents 412-416 at a time T=2 622 when an Agent C vote 636, 646, 656 is updated as ready while the Agent A vote 532, 542, 552 and the Agent B vote 434, 444, 454 have not been updated from dispatching. Agent C 416 updated the Agent C vote 558 in the Agent C status information 450 to ready. Having updated the Agent C status information 450, Agent C 416 transmits a status message to communicate the Agent C status information 450 to Agent A 412 and Agent B 414. However, although the Agent C vote 636, 646, 656 has been updated to ready in the agent status information 430, 440, 450, the Agent A vote 532, 542, 552 remains as dispatching and the Agent B vote 534, 544, 554 remains as dispatching. Because the agents 412-416 are configured to update a consensus only when finding a unanimous consensus of the states of the agents 412-416, a consensus 538, 548, 558 remains as dispatching.

Figure 7:
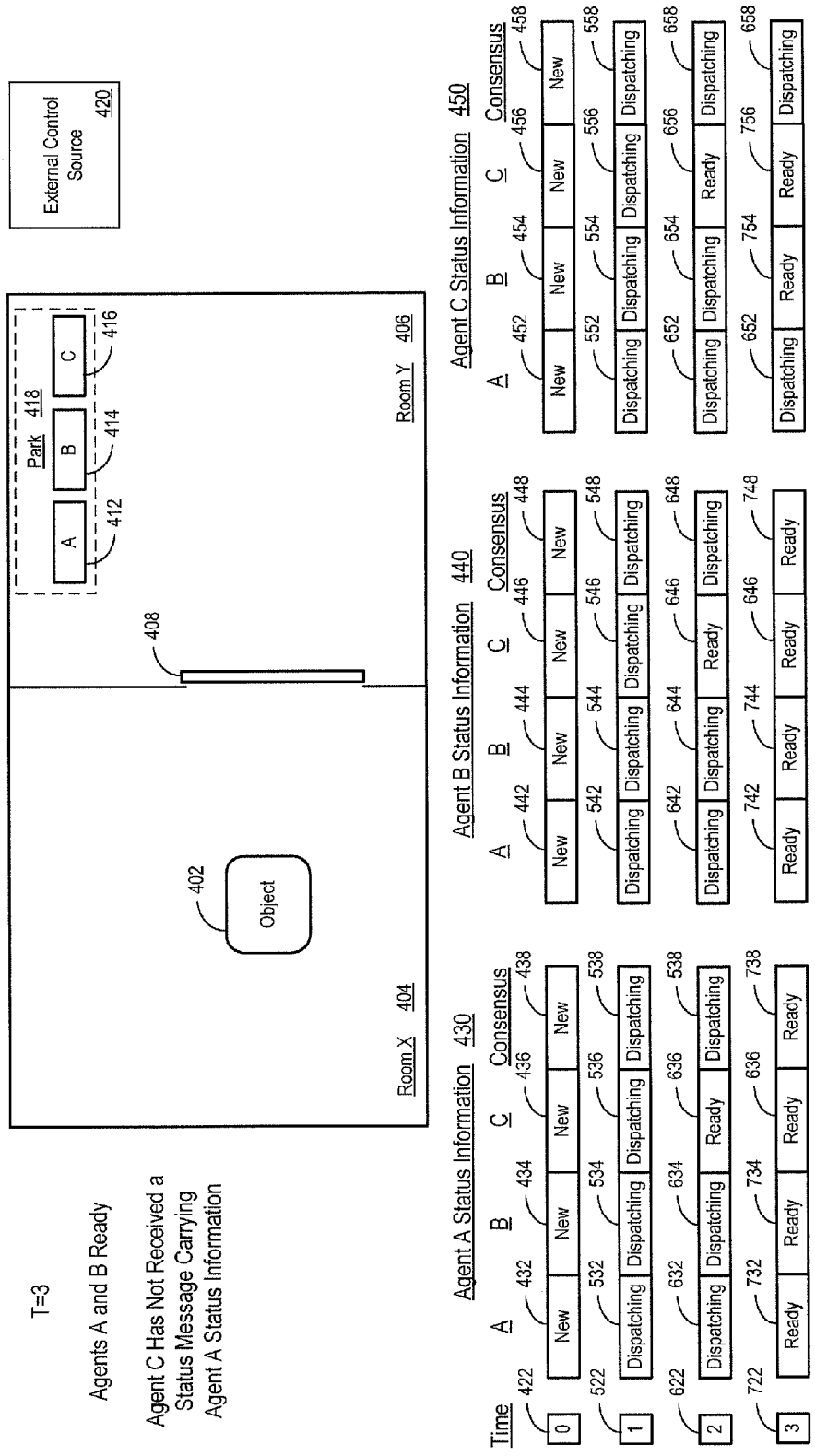

FIG. 7 is a block diagram showing each of the agents 412-416 at a time T=3 722 when Agent A 412 and Agent B 414 have reached a ready state. Agent A 412 and Agent B 414 have each received status information from the other agents, but Agent C 416 has not yet received updated status information regarding Agent A 412. In the Agent A status information 430, an Agent A vote 732 is updated to ready and an Agent B vote 734 is updated to ready. Agent A 412 previously updated the Agent C vote 636 to ready. Because the Agent A status information 430 indicates that all of the agents 412-416 vote for the ready state at the time T=3 722, a consensus 738 is updated to ready. Similarly, in the Agent B status information 440, an Agent A vote 742 is updated to ready and an Agent B vote 744 is updated to ready, while the Agent C vote 646 was previously updated to ready. Because the Agent B status information 430 indicates that all of the agents 412-416 now vote for and agree on the ready state, a consensus 748 is updated to ready.

Agent C 416 has not yet received a status message bearing status information updating the vote of Agent A 412 to the ready state. Thus, the Agent C status information 450 continues to show that the Agent A vote 652 as dispatching. Although an Agent B vote 754 has been updated to ready and the Agent C vote 656 previously was updated to ready, the consensus 658 for the Agent C status information 450 remains as dispatching.

Figure 8:
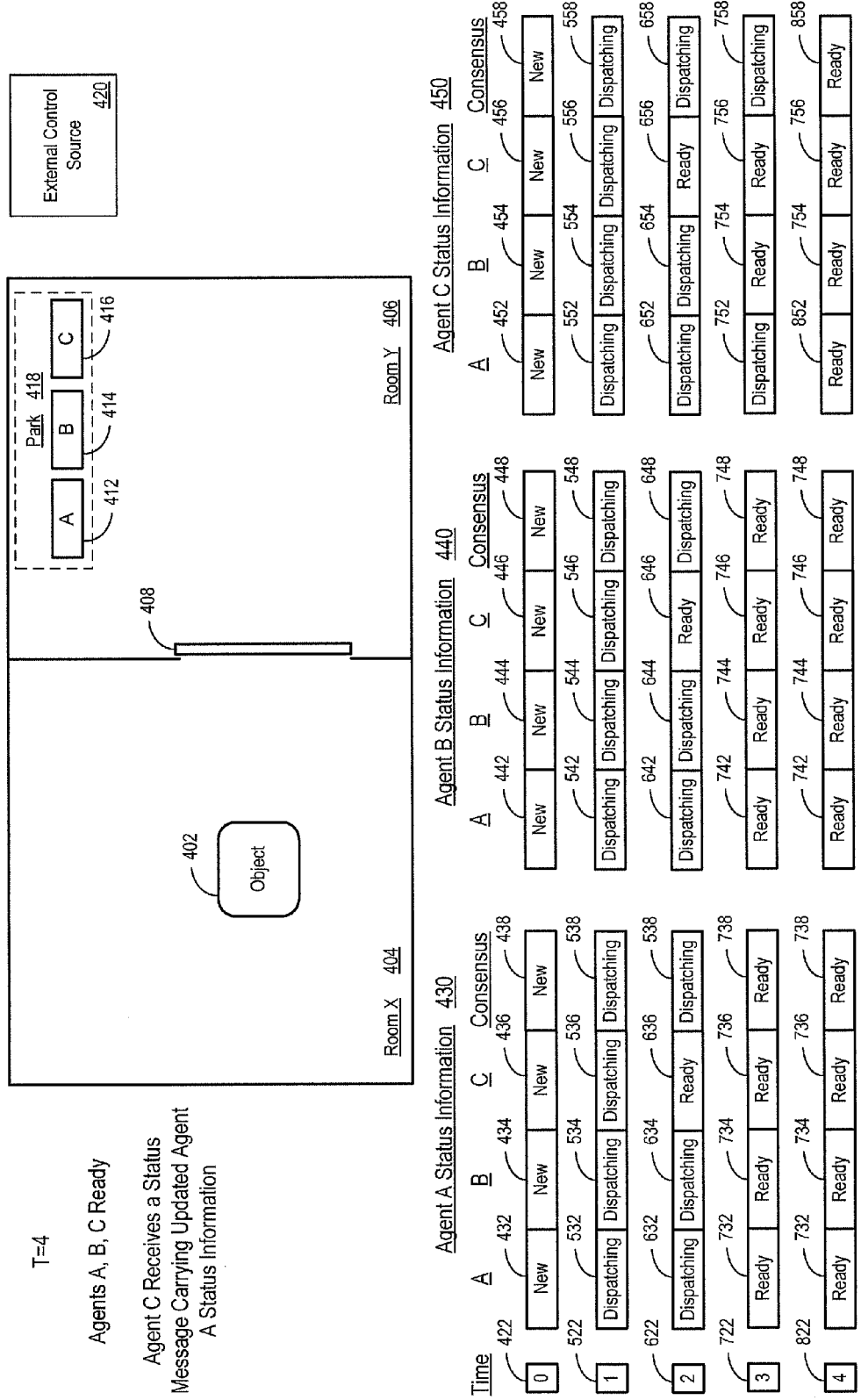

FIG. 8 is a block diagram showing each of the agents 412-416 at a time T=4 822 when Agent C has received a status message bearing updated status information from Agent A 412. Agent C 416 may have received the updated status information of Agent A 412 either by receiving a transmission of the Agent A status information 430 from Agent A 412 or by receiving a status message bearing the Agent B status information 440 from Agent B 414, both of which at the time T=3 722 showed that Agent A 412 had reached the ready state. Because the Agent A status information 430 and the Agent B status information 440 were current at the time T=3 722, no changes are made to the Agent A status information 430 or to the Agent B status information 440. Also because the Agent A status information 430 and the Agent B status information were current at the time T=3 722, the consensus 738 of the Agent A status information 430 and the consensus 748 of the Agent B status information 440 remain unchanged. However, the Agent C status information 450 is updated to show an Agent A vote 852 as ready. Similarly, because the Agent C status information 450 shows that all of the agents 412-416 agree on the ready state, a consensus 858 is updated to ready.

Figure 9:
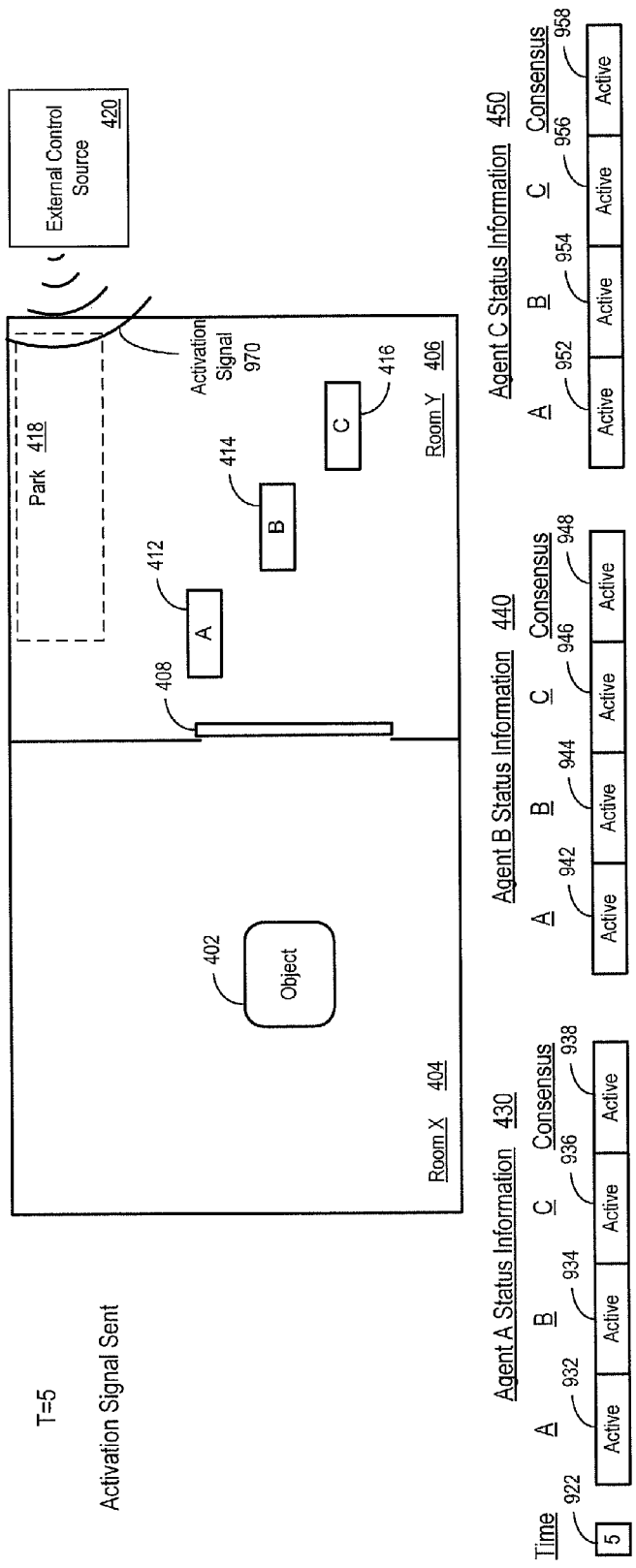

FIG. 9 is a block diagram showing each of the agents 412-416 at a time T=5 922. At the time T=5 922, all of the agents 412-416 have reported a ready state and the external control source 420 has sent an activation signal 970 to the agents 412-416. According to an illustrative embodiment, once all of the agents 412-416 have reached and voted for the ready state as determined by a consensus 430, 440, 450 of the status information maintained by each of the agents 412-416, the agents 412-416 automatically update to the active state and engage in performing an assigned role. According to another illustrative embodiment, as shown in FIG. 9, the transition of the agents 412-416 to an active state is triggered by the external control source 420. The external control source 420, like the agents 412-416, may monitor the status information transmitted by the agents 412-416 to identify when the agents 412-416 have reached a consensus that the agents 412-416 agree on the ready state before updating to the active state.

At the time T=5 922, in response to receiving the activation signal 970 from the external control source 420, each of the agents 412-416 updates its own state to the active state. Thus, the Agent A status information 430 is updated to show an Agent A vote 932 as active, the Agent B status information 440 is updated to show an Agent B vote 944 as active, and the Agent C status information 450 is updated to show an Agent C vote 956 as active. In response to changing its own state, each of the agents 412-416 transmits its status information to enable others of the agents 412-416 to update locally-maintained status information 430, 440, 450. Thus, after receiving updated status information from Agent B 414 and Agent C 416, the Agent A status information 430 updates an Agent B vote 934 to active and updates an Agent C vote 936 to active. Because the votes of all the agents 412-416 are in agreement according to the Agent A status information 430, a consensus 938 is updated to active. Agent A 412 thus begins performing its first task: moving to the door 408.

After receiving updated status information from Agent A 412 and Agent C 416, the Agent B status information 440 updates an Agent A vote 942 to active and updates an Agent C vote 946 to active. Because the votes of all the agents are in agreement, a consensus 948 for the Agent B status information 440 is updated to active. Agent B 414 then begins performing the task of moving to the door 408. After receiving updated status information from Agent A 412 and Agent B 414, the Agent C status information 450 updates an Agent A vote 952 to active and updates an Agent B vote 954 to active. Because the votes of all the agents 412-416 are in agreement, a consensus 958 for the Agent C status information 440 is updated to active. Agent C 416 then begins performing the task of moving to the door 408.

Figure 10:
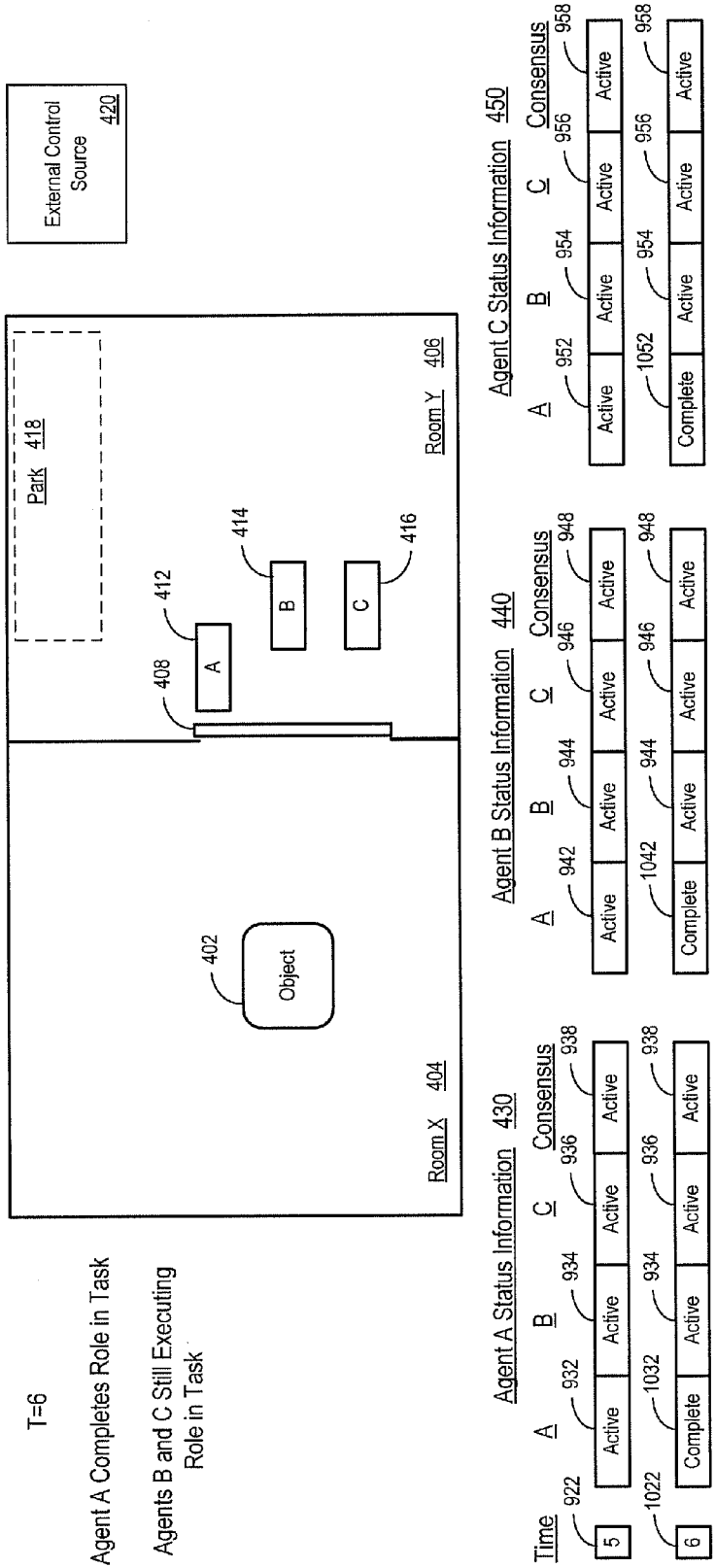

FIG. 10 is a block diagram showing each of the agents 412-416 at a time T=6 1022. At the time T=6 1022, Agent A 412 has completed its role in the task and has reached the door 408. Thus, the Agent A status information 430 is updated to show an Agent A vote 1032 as complete and the updated Agent A status information 430 is transmitted to the other agents 414, 416. Agent B 414 and Agent C 416 have not yet completed their roles in the task and, thus, each is still active. Thus, the Agent A status information 430 indicates that the Agent B vote 934 is active and the Agent C vote 936 is active. The consensus 938 for the Agent A status information 430 continues as active.

Similarly, the Agent B status information 440 is updated to shown an Agent A vote 1042 as complete, but indicates the Agent B vote 944 as active and the Agent C vote 946 as active. The consensus 948 for the Agent B status information 440 remains active. The Agent C status information 450 is updated to shown the Agent A vote 1052 as complete and indicates the Agent B vote 954 as active and the Agent C vote 956 as active. The consensus 958 for the Agent C status information 450 remains active.

Figure 11:
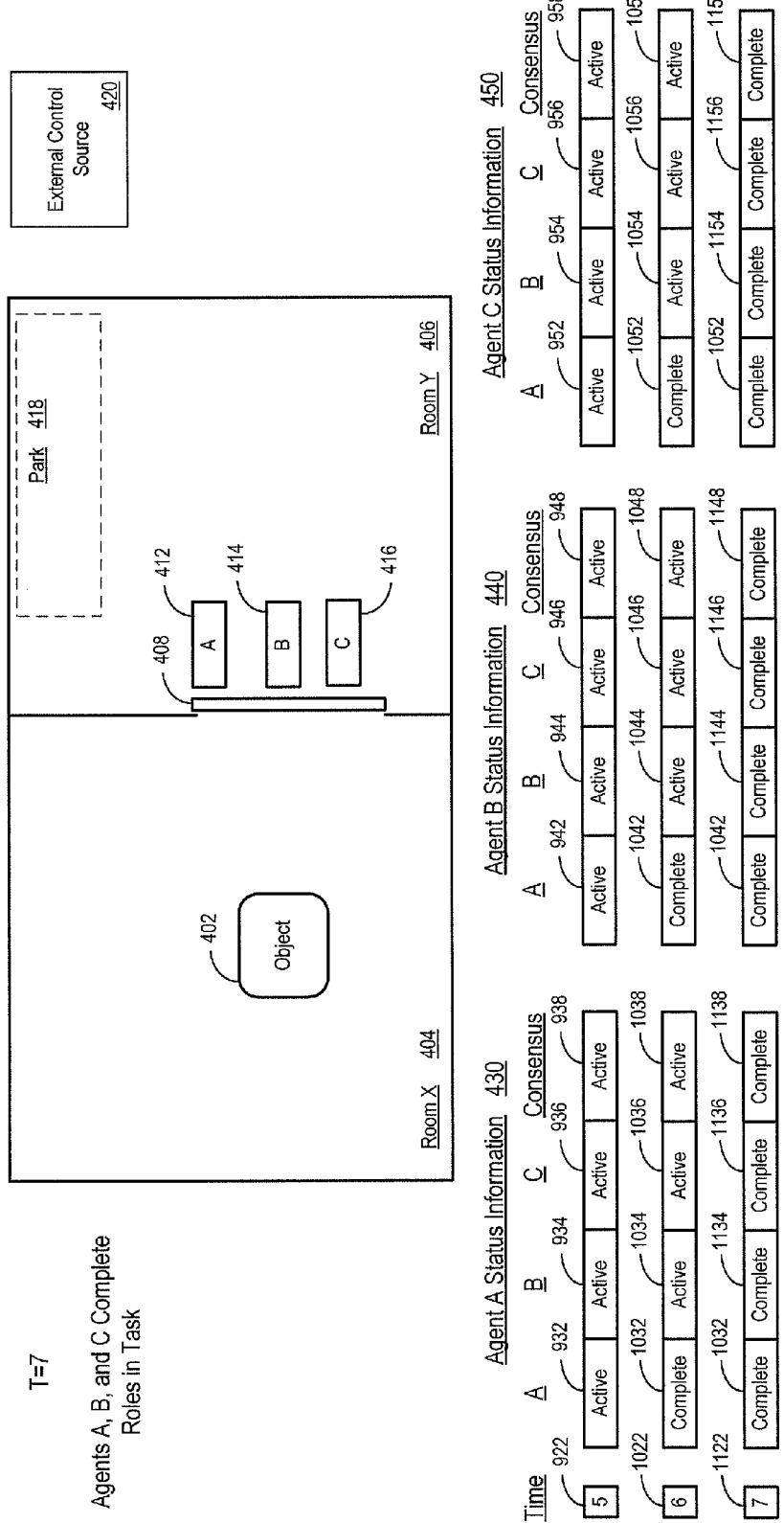

FIG. 11 is a block diagram showing each of agents 412-416 at a time T=7 1122. At the time T=7 1122, Agent B 414 and Agent C 416, like Agent A 412, have completed their roles in the task and have reached the door 408. Thus, the Agent B status information 440 is updated to show an Agent B vote 1144 as complete and the Agent B status information 440 is transmitted to the other agents 412, 416. The Agent C status information 450 also is updated to show an Agent C vote 1156 as complete and the Agent C status information 450 is transmitted to the other agents 412, 414.

In response to receiving updated status information from the other agents 414, 416, the Agent A status information 430 is updated to show an Agent B vote 1134 as complete and to shown an Agent C vote 1136 as complete. As a result, the consensus 1138 for the Agent A status information 430 is updated to complete. The Agent B status information 440 is updated to show an Agent C vote 1146 as complete. As a result, a consensus 1148 for the Agent B status information 440 is updated to complete. The Agent C status information 450 is updated to show an Agent C vote 1154 as complete. As a result, a consensus 1158 for the Agent C status information 450 is updated to complete.

Figure 12:
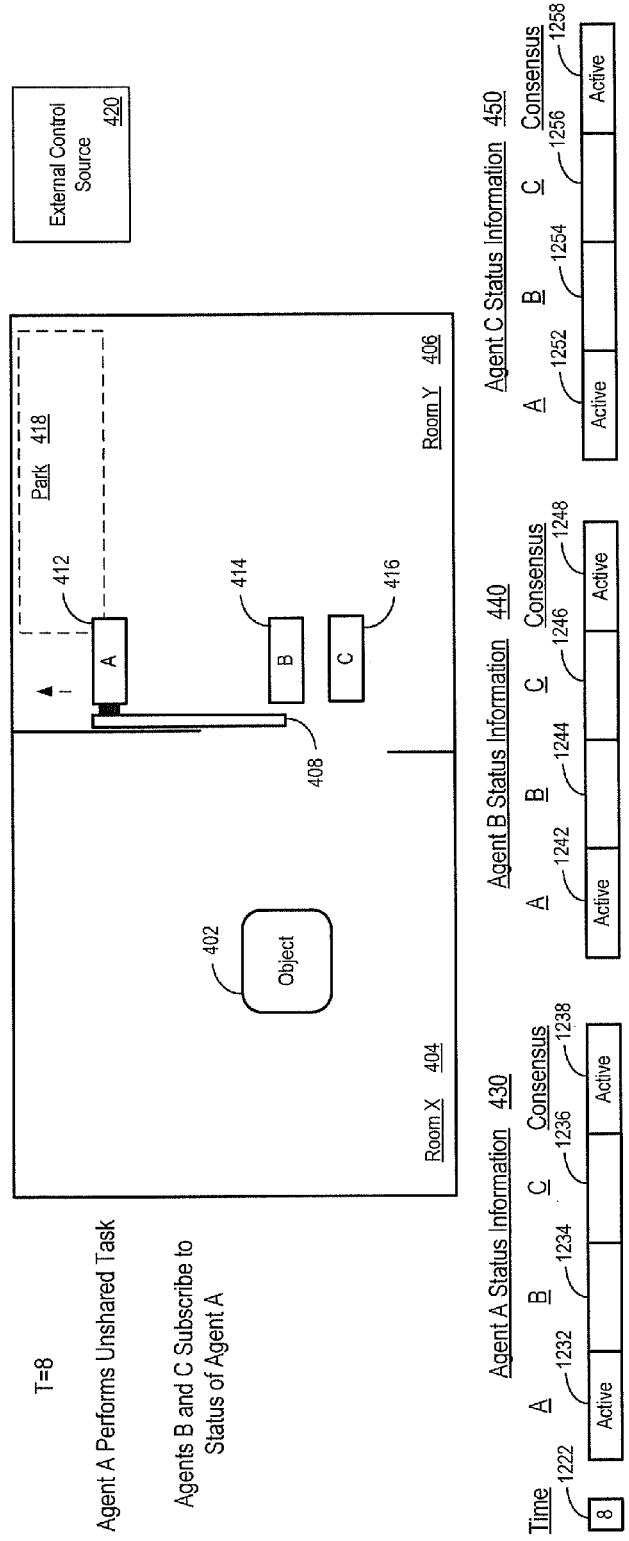

FIG. 12 is a block diagram showing each of the agents 412-416 at a time T=8 1222. At the time T=8 1222, Agent A 412 is active in performing an unshared task of opening the door 408. Because the task of opening the door 408 is not shared, the task may be performed by Agent A 412 without assistance of the other agents 414, 416 and, thus, without consensus of the other agents 414, 416.

According to an illustrative embodiment, the Agent A status information 430 is updated to show an Agent A vote 1232 as active. An Agent B vote 1234 and an Agent C vote 1236 report no state because Agent B 414 and Agent C 416 are not participants in the task being performed by Agent A 412. As a result, a consensus 1238 for the Agent A status information 430 depends only on the Agent A vote 1232. The consensus 1238 thus is active.

Although Agent B 414 and Agent C 416 do not participate in the task of opening the door 408, Agent B 414 and Agent C 416 may nonetheless subscribe to the Agent A status information 430 for the unshared task. Agent B 414 and Agent C 416 are assigned to the task of engaging and moving the object 402. Agent B 414 and Agent C 416 depend upon Agent A 412 to open the door 408 as a prerequisite to the task of moving the object 402. Thus, by subscribing to the Agent A status information 430, Agent B 414 and Agent C 416 may determine when the door 408 is open so that they can proceed with their next task. Subscribing to other agents' task thus may enable the agents 4412-416 to engage in unshared but interdependent tasks where the performance of one task may depend on the completion of a task to be performed by one or more of the agents 412-416.

The Agent B status information 440 indicates that an Agent A task state 1242 is active. Again, because Agent B 414 and Agent C 416 are non-participants in the unshared task of Agent A 412, an Agent B vote 1244 and an Agent C vote 1246 show no state. A consensus 1248 depends solely on the Agent A vote 1242. While the Agent A vote 1242 is still active, i.e., Agent A 412 is still in the process of opening the door 408, Agent B 414 waits to perform its next task. When the Agent A vote 1242 is updated to show that the task of Agent A 412 is complete, Agent B 414 may proceed with its next task. Similarly, the Agent C status information 450 indicates that an Agent A task state 1252 is active. Again, because Agent B 414 and Agent C 416 are non-participants in the unshared task of Agent A 412, an Agent B vote 1254 and an Agent C vote 1256 show no state. A consensus 1258 depends solely on the Agent A vote 1242. While the Agent A vote 1252 is still active, i.e., Agent A 412 is still in the process of opening the door 408, Agent C 416 waits to perform its next task. When the Agent A vote 1252 is updated to show that the task of Agent A 412 is complete, Agent C 416 may proceed with its next task.

Figure 13:
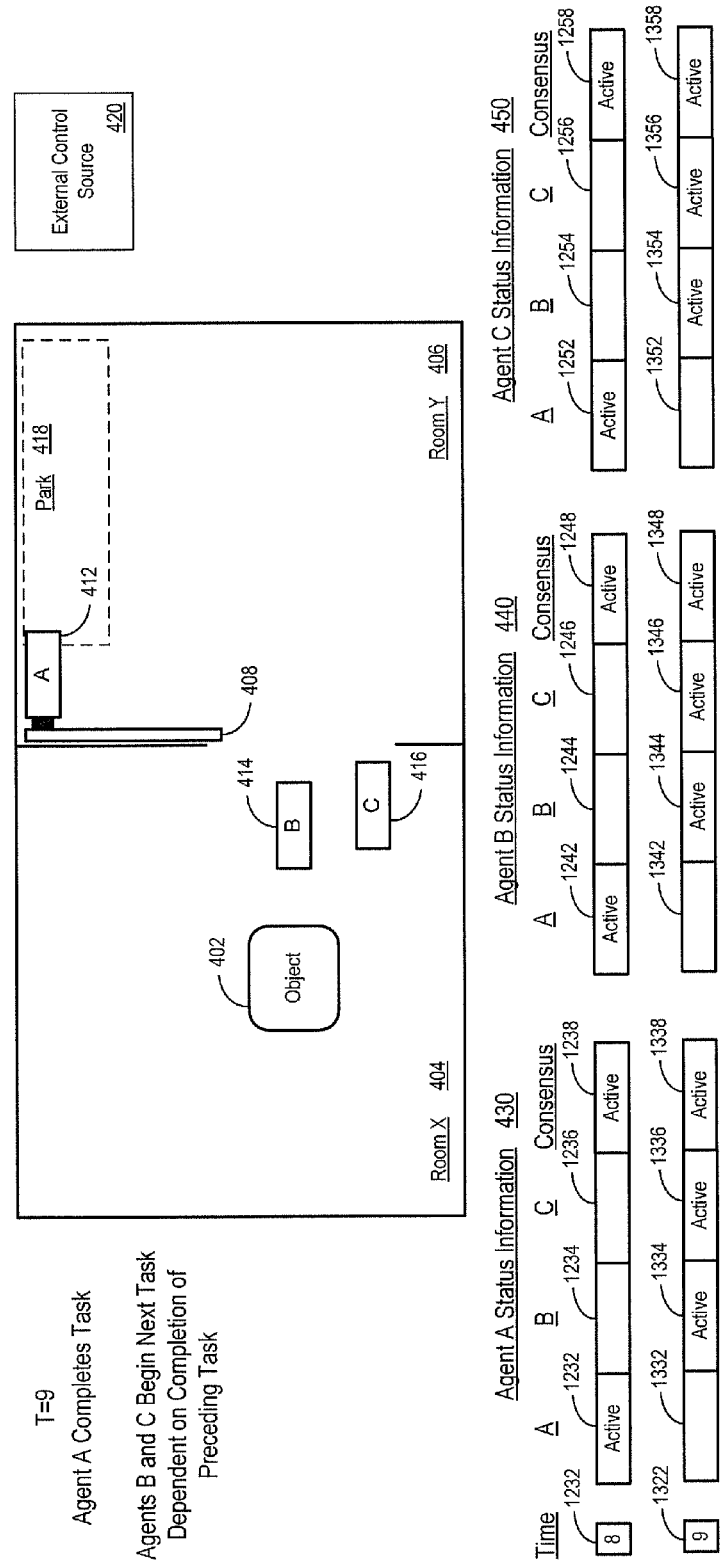

FIG. 13 is a block diagram showing each of agents 412-416 at a time T=9 1322. By the time T=9 1322, Agent A 412 has completed its performance of its unshared task of opening the door 408. Thus, at the time T=9 1322, Agent B 414 and Agent C 416 are moving into Room X 404, approaching the object 402 in preparation to move the object 402.

At the time T=9 1322, Agent B 414 and Agent C 416 are engaged in a shared task in which Agent A 412 does not participate. Agent A 412 will wait for Agent B 414 and Agent C 416 to engage the object 402, move the object 402, and disengage from the object 402, at which time Agent A 412 will close the door 408. Thus, while Agent B 414 and Agent C 416 are active in performing one or more tasks in which Agent A 412 does not participate, Agent A 412 may subscribe to the status information transmitted by Agent B 414 and Agent C 416 to determine when Agent A 412 will next perform an action.

Assuming that Agent B 414 and Agent C 416 transmit status information to each other as previously described, the Agent B status information 440 is updated to indicate that an Agent B vote 1344 and an Agent C vote 1346 as active. An Agent A vote 1342 indicates no state to indicate that Agent A 412 is not participating in the present task. A consensus 1348 for the Agent B status information 440 shows that the participating agents are active irrespective of the state of Agent A 412. The Agent C status information 450 is updated to indicate an Agent B vote 1354 and an Agent C vote 1356 as active. An Agent A vote 1352 shows no state. A consensus 1358 for the Agent C status information 450 shows that the participating agents are active irrespective of the state of Agent A 412.

Figure 14:
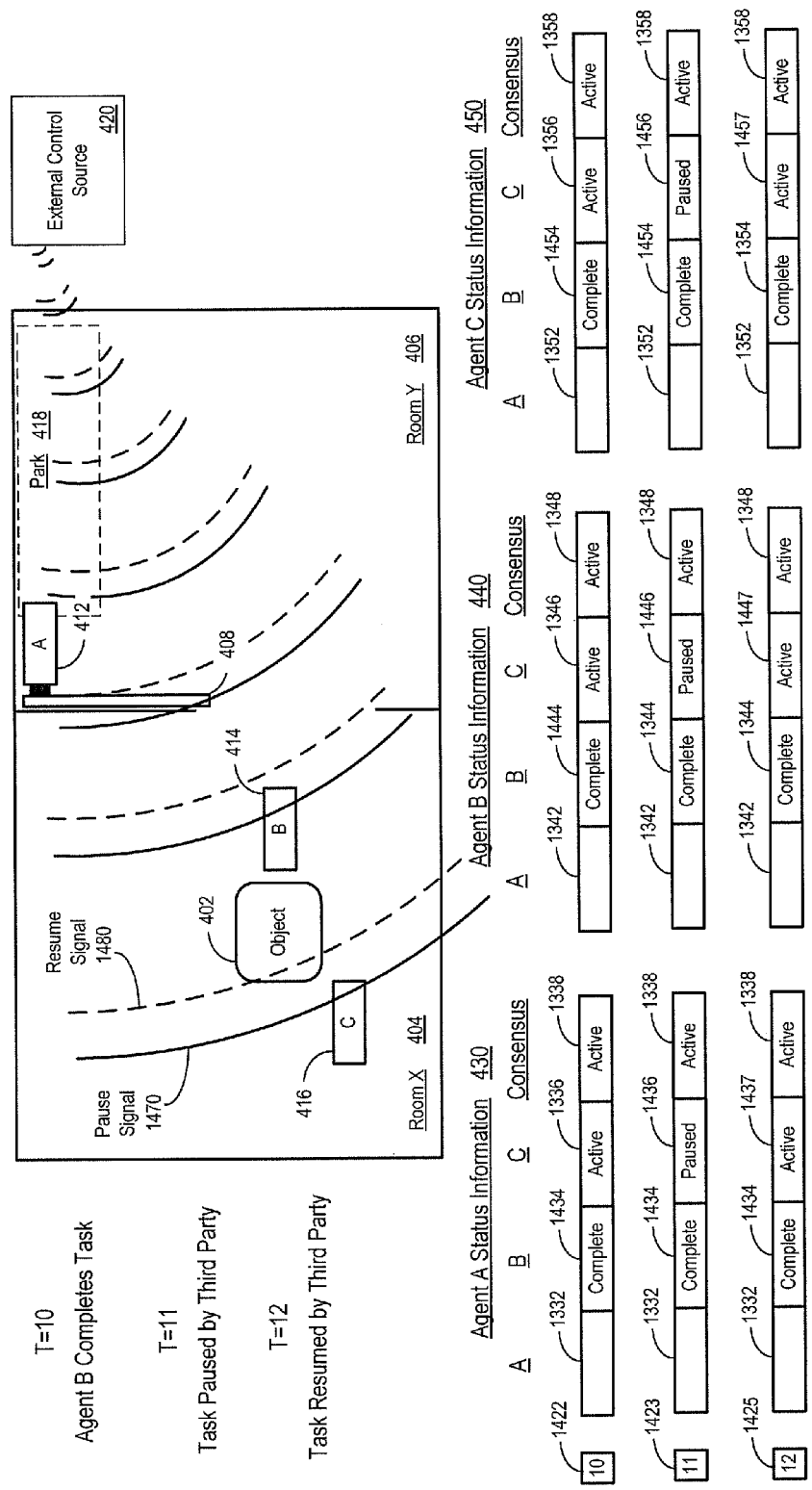

FIG. 14 is a block diagram showing each of the agents 412-416 at a time T=10 1422, at a time T=11 1423, and at a time T=12 1425. FIG. 14 illustrates the external control source 420 pausing a task by sending a pause or suspend signal 1470 and resuming the task by sending a resume signal 1480.

At the time T=10 1422, Agent B 414 has reached its intended position adjacent the object 402, while Agent C 416 has not yet reached its intended position. Agent B 414 and Agent C 416 transmit status information to each other (which is also monitored by Agent A 412). The Agent B status information 440 is updated to change an Agent B vote 1444 to complete while the Agent C status information 1346 remains active. An Agent B vote 1434 is updated to complete in the Agent A status information 430 and an Agent B vote 1454 is updated to complete in the Agent C status information 450. However, the consensus 1338, 1348, and 1358 remains active because Agent C 416 has not completed its portion of the task.

At the time T=11 1423, the external control source 420 transmits the pause or suspend signal 1470. According to a particular illustrative embodiment, upon receipt of the pause signal 1470, any active agent participating in a task updates its vote to paused. Thus, an Agent B vote 1434, 1444, 1454 and an Agent C vote 1436, 1446, 1456 are changed to paused.

Figure 15:
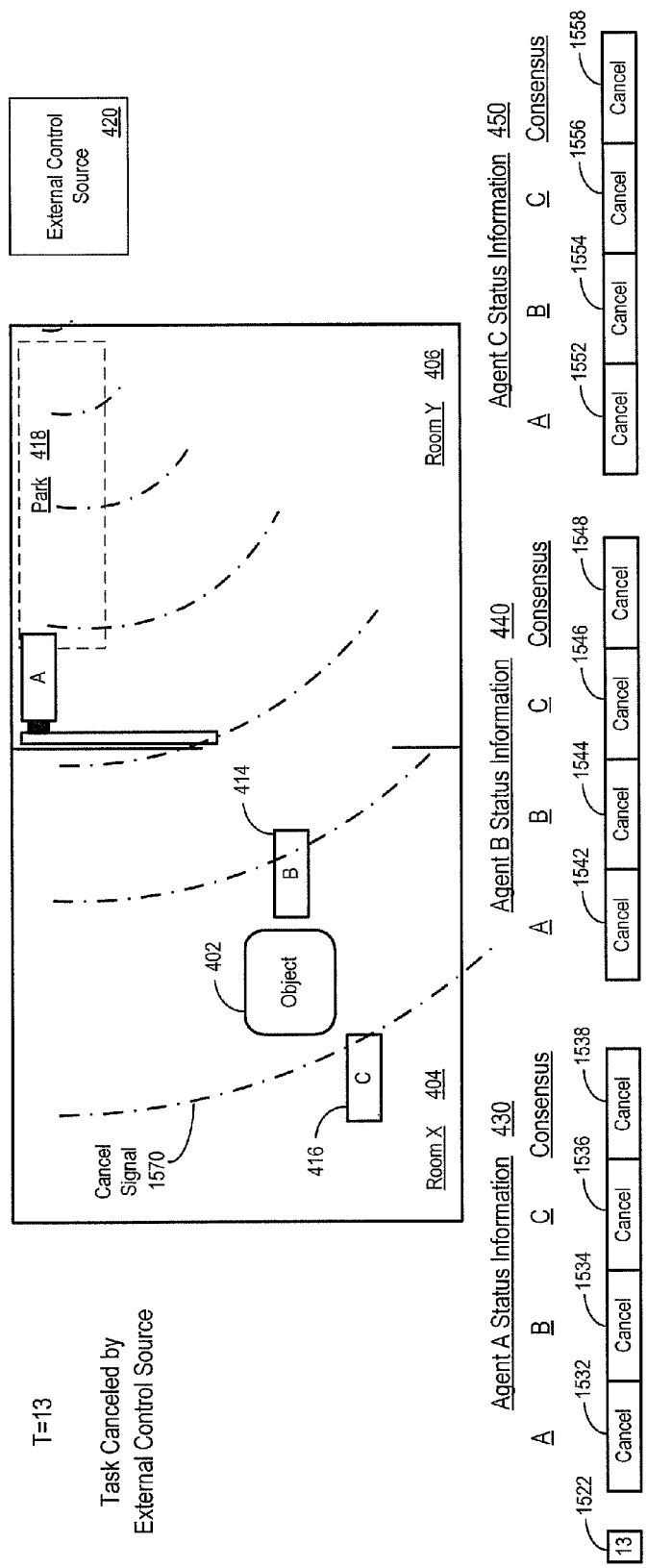

FIG. 15 is a block diagram showing each of the agents 412-416 at a time T=13 1522 after the external control source 420 has transmitted a cancel signal 1570. According to an illustrative embodiment, regardless of the status of an agent when the cancel signal 1570 is sent, the agents 412-416 cease operations. Each of the agents 412-416 updates its vote to cancel and transmits updated status information 430, 440, 450 to other agents. The Agent A vote 1532, 1542, 1552 is updated to cancel. The Agent B vote 1534, 1544, 1554 is updated to cancel. The Agent C vote 1536, 1546, 1556 is updated to cancel. The consensus 1538, 1548, 1558 for each of the agents 412-416 is updated to cancel.

Figure 16:
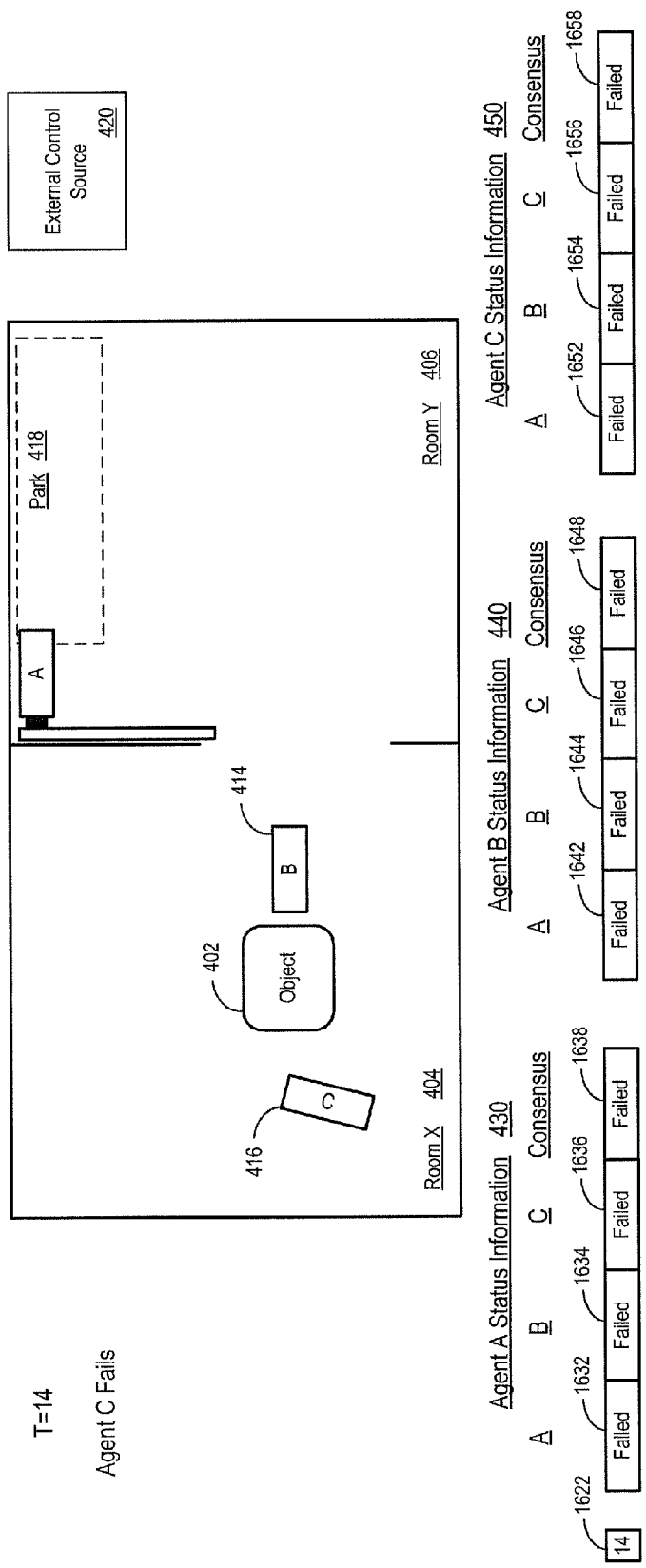

FIG. 16 is a block diagram showing each of the agents 412-416 at a time T=14 1622 after Agent C 416 has failed to perform its task. For purposes of FIG. 16, it is assumed that the external control source 420 has not canceled performance of the task as described with reference to FIG. 15 and that, before the failure of Agent C 416, each of the agents had the same status as at the time T=12 1425 (FIG. 14).

The failure of Agent C 416 to perform the task may be as a result of a system failure, as a result of an external condition, or any number of other factors. When Agent C 416 fails, it updates an Agent C vote 1656 to failed in the Agent C status information 450. The Agent C status information 450 is transmitted to the other agents, thereby causing the Agent A status information 430 to update an Agent C vote 1636 to failed. The Agent B status information 440 is also updated to update an Agent C vote 1646 as failed. According to a particular illustrative embodiment, when one of the agents 412-416 updates its vote to failed, each of the other agents updates its vote to failed. Thus, an Agent A vote 1632, 1642, 1652 and an Agent B vote 1634, 1644, 1654 is updated to failed. Further, a consensus 1638, 1648, 1658 for each of the agents 412-416 is updated to failed. Steps may be taken via the external control source 420 to repair the task or the plan in response to the failure of Agent C 416.

Figure 17:
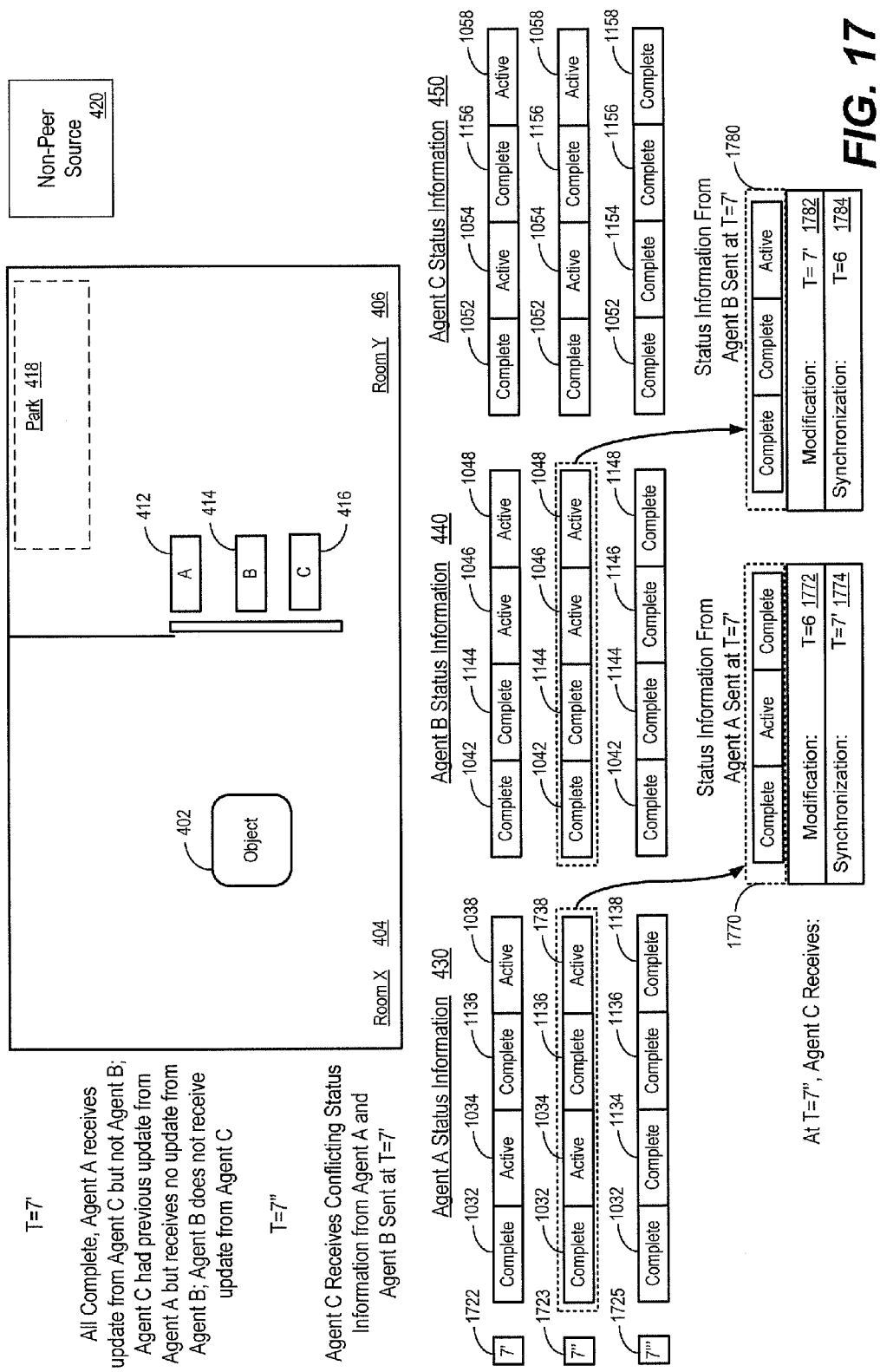

FIG. 17 is a block diagram showing each of the agents 412-416 at a time T=7' 1722, at a time T=7" 1723, and at a time T=7'" 1725. Referring to FIG. 11, at the time T=7, all of the agents 412-416 reached a complete state and had communicated updated status information to one another enabling the consensus 1138, 1148, and 1158 to report a complete state. However, because the agents 412-416 may asynchronously report state updates (e.g., in response to making updates to their own status or in response to receiving status information from others of the agents 412-416), it is possible that conflicting status information will be received by the agents 412-416. In the example illustrated in FIG. 17, it is assumed that, at the time T=7' 1722, while all the agents have reached a complete state, Agent A 412 receives updated status information from Agent C 416 but not from Agent B 414. Agent B 414 has received updated status information from Agent A 412 but not from Agent C 416. Agent B 414 updates the Agent B status information 440 to include the Agent B vote 1144 as complete. At the time T=7", Agent A 412 and Agent B 414 transmit current status information even though each has not yet received updated status information from others of the agents 412-416.

At the time T=7'", Agent C 416 receives conflicting updates from Agent A 412 and Agent B 414. At the time T=7'", Agent A 412 and Agent B 414 have received updated status information showing that all of the agents 412-416 have completed their tasks, but Agent C 416 does not have this information. Instead, updated status information 1770 received by Agent C 416 from Agent A 412 indicates that the Agent A vote 1032 is complete, the Agent B vote 1034 is active, and the Agent C vote 1136 is complete. Updated status information 1780 received by Agent C 416 from Agent B 414 indicates that the Agent A vote 1042 is complete, the Agent B vote 1144 is complete, and the Agent C vote 1046 is active. If Agent C 416 were to accept one update or the other, Agent C 416 would update to an incorrect state. In the simple, three-agent example of FIG. 17, it would be a simple matter to compare the state entries for the agents 412-416 and determine which reported status information is the most current, but in a system with many widely dispersed agents sending numerous asynchronous updates, resolution based on inspection and comparison of content may not be possible.

In a particular illustrative embodiment, the updated status information is asynchronously exchanged using optimistic replication. Optimistic replication uses versioning control to differentiate between updates to determine when updates should be accepted, ignored, or merged. According to an illustrative embodiment, a form of optimistic replication using modification vectors and synchronization vectors is used for versioning control.

A modification vector indicates when the agent making the update last modified the status information. The updated status information 1770 from Agent A 412 has a modification vector 1772 showing that Agent A 412 last made a modification—not including synchronization to other status information—at time the T=6 as illustrated in FIG. 10. A synchronization vector 1774 shows that Agent A 412 last synchronized its status information at the time T=7' (in response to receiving updated status information from Agent C 416). The updated status information 1780 from Agent B 414 has a modification vector 1782 showing that Agent B 414 last modified the status information at the time T=7' when it updated the Agent B vote 1144 to complete. The synchronization vector 1784 shows that Agent B 414 last synchronized to another update at the time T=6 upon receiving a state update from Agent A 412 as illustrated in FIG. 10.

Using the modification and synchronization vectors, it can be determined when one update is more current than another update. When update times identified by the modification and synchronization vectors for a second update are both more recent than for a first second update, the second update is more current than the first update and may be used to replace the first update. When the times stored by the modification and synchronization vectors for the second update are the same as for a first update, the updates are equivalent. However, when the update time identified by a modification vector does not agree with the update time identified by the synchronization vector, a resolution scheme may be used to determine when one vector may be more current than another or may be used to determine when more current entries in one set of status information may be merged to update status information in a previously-generated set of status information. The Cox et al. article describes processes for evaluating the modification and synchronization vectors to resolve apparent conflict in updating status information.

Figure 18:
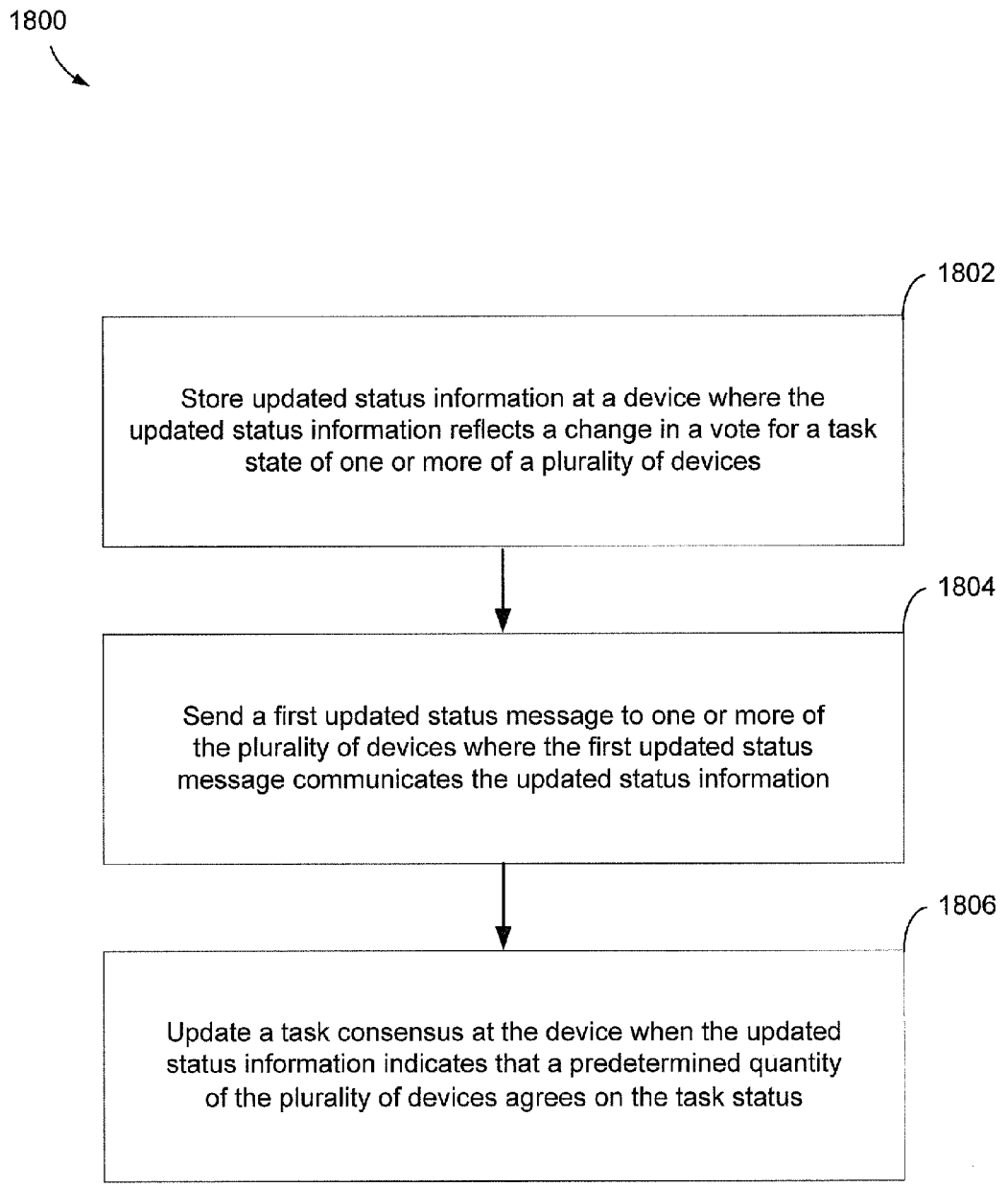
FIG. 18 is a flow diagram of an illustrative embodiment of a method to coordinate a plurality of devices in performing a task.

FIG. 18 is a flow diagram of an illustrative embodiment of a method 1800 for a device to coordinate with a plurality of devices in performing a task. The method 1800 is performable, for example, by a control system as described with reference to FIG. 19 or by a general purpose computing system as described with reference to FIG. 20.

Updated status information is stored at a device where the updated status information reflects a change in a vote for a task state of one or more of a plurality of devices, at 1802. A first updated status message is sent to one or more of the plurality of devices where the first updated status message communicates the first updated status information. A task consensus is updated at the device when the updated status information indicates that a predetermined quantity of the plurality of devices agrees on the task state, at 1806.

Figure 19:
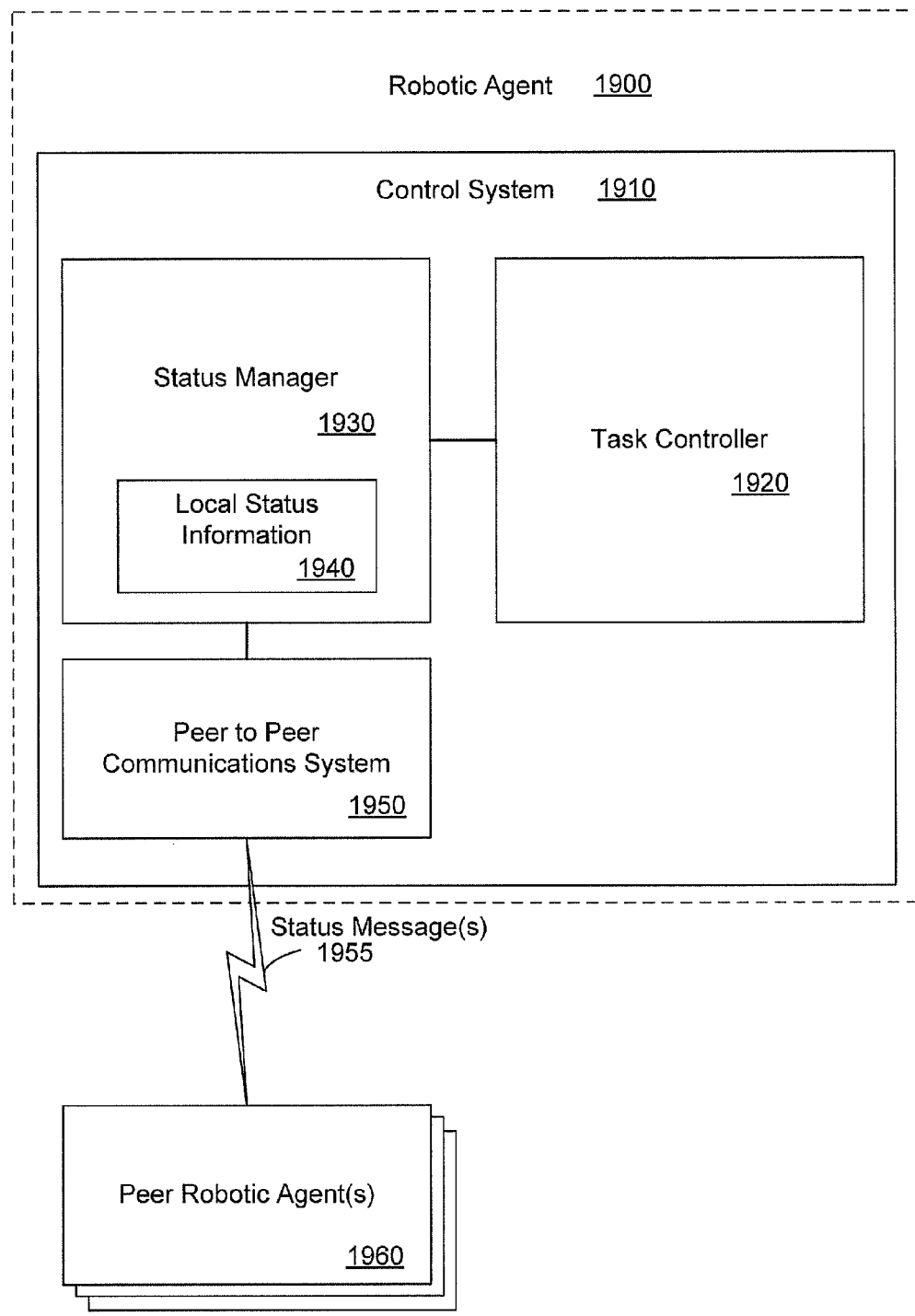
FIG. 19 is a block diagram of a robotic agent including an illustrative embodiment of a system to coordinate a plurality of robotic agents in performing a task.

FIG. 19 is a block diagram of a robotic agent 1900 including an illustrative embodiment of a control system 1910 for coordinating a plurality of robotic agents in performing a task. The robotic agent 1910 may be one of a number of robotic agents that participate in the performance of shared tasks or in a series of interdependent tasks. The robotic agent 1900 may be a robotic vehicle, such as an unmanned aerial vehicle (UAV), a mobile robot such as the robotic agents of FIGS. 4-17, an assembly robot on in a manufacturing plant, a robotic software agent that monitors network operations, or any other type of robotic agent.

The control system 1910 includes a task controller 1920 to control the robotic agent 1900 in performance of an assigned role in a task that may be a shared task, an interdependent task, or an unshared task. Considering the example of FIGS. 4-17, the task controller may include control logic adapted to engage a manipulator to engage an object or a door and then motivate the manipulator or the entire robotic agent 1900 to move moving the object to a designated position. In one illustrative embodiment, the task controller 1920 is adapted to initiate performance by the robotic agent 1900 of the assigned role and to report completion of the performance of the assigned role.

A status manager 1930 maintains and monitors local status information 1940. As previously described, the local status information 1940 includes the task state of the robotic agent 1900 as well as a peer task state one or more peer robotic agents 1960. The status manager 1930 communicates with the task controller 1920 to update the local status information 1940 based on the task state of the robotic agent 1900. The state status manager 1930 also communicates with a peer to peer communications system 1950 to exchange status messages 1955 with peer robotic agents 1960 to determine a peer task state for each of the one or more peer robotic agents 1960.

The peer to peer communications system 1950, in addition to communicating with the status manager 1930, also receives state messages from the one or more peer robotic agents. The peer to peer communications system 1950 receives a state message from the peer robotic agents that communicate the status information maintained by each of the agents as described with reference to FIGS. 4-17. The peer to peer communications system 1950 is also adapted to send state messages to the one or more peer robotic agents 1960 to communicate the local status information when the local status information 1940 is updated.

Figure 20:
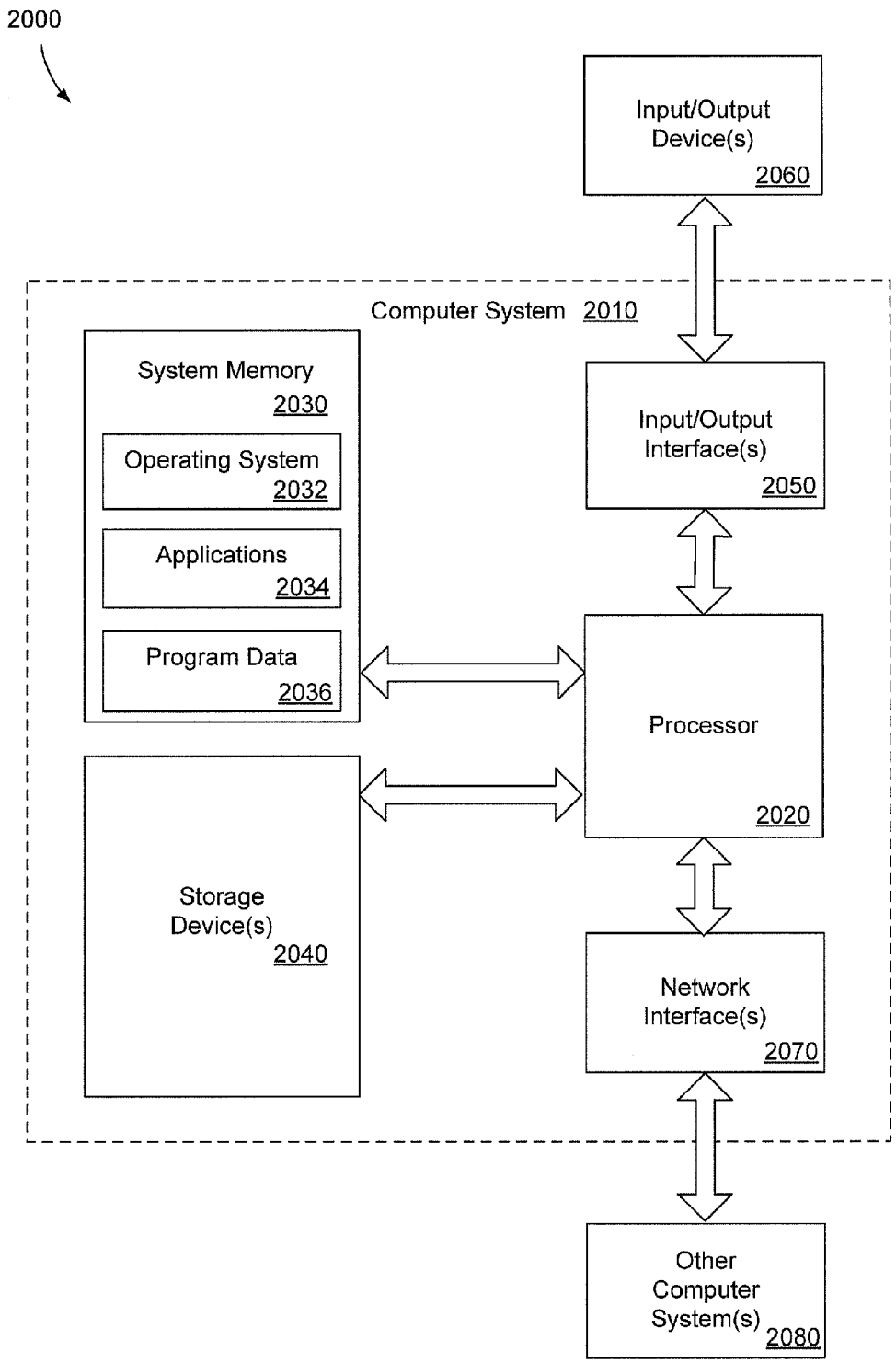
FIG. 20 is a block diagram of a general purpose computer system operable to implement embodiments of computer-implemented methods and computer-executable program instructions in coordinating a plurality of robotic agents in performing a task.

FIG. 20 is a block diagram of a general purpose computer system 2000 operable to implement embodiments of computer-implemented methods and computer-executable program instructions illustrated by FIGS. 1-18. In one illustrative embodiment, a computing device 2010 includes an autonomous agent equipped to perform a coordinated task in concert with one or more other autonomous agents. The computing device 2010 typically includes at least one processor 2020. Within the computing device 2010, the processor 2020 communicates with a system memory 2030, one or more storage devices 2040, one or more input/output devices 2060, and one or more network interfaces 2070 through which the computing device communicates with one or more other computer systems 2080.

The system memory 2030 may include volatile memory devices, such as random access memory (RAM) devices and nonvolatile memory devices such as read-only memory (ROM), programmable read-only memory, and flash memory. The system memory 2030 typically includes an operating system 2032, which may include a basic/input output system for booting the computing device 2010 as well as a full operating system to enable the computing device 2010 to interact with users, other programs, and other computer systems 2080. The system memory 2030 also typically includes one or more application programs 2034, such as programs that direct the autonomous agent in the performance of actions that are parts of the tasks that, in turn, may be parts of a shared plan. The system memory 2030 also may include program data 2036, such as status information for the local autonomous agent or one or more other autonomous agents, as previously described.

The processor 2020 also communicates with one or more storage devices 2040. The storage devices 2040 may include removable, nonvolatile storage devices such as magnetic disks, optical disks, or flash memory devices. The storage devices 2040 also may include nonremovable storage devices that typically include one or more of magnetic disks and nonvolatile memory.

The processor 2020 communicates via one or more input/output interfaces 2050 with one or more input/output devices 2060 that enable the computing device 2010 to interact with a user. The input/output devices 2060 may include keyboards, pointing devices, microphones, speakers, and displays. The processor 2020 also communicates with one or more network interfaces 2070 that enable the computing device 2010, as used in an autonomous agent, to communicate with other autonomous agents.

Not all of the components or devices illustrated in FIG. 20 or otherwise described in the previous paragraphs are necessary to support implementations of the present disclosure. For example, a device may include an integrated system memory and storage device including a flash memory configured to store all programs and data for operation of a system. In addition, if all input and output is communicated via the network interfaces 2070, a system may not include any other input/output interfaces 2050 or input/output devices 2060.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A control system for controlling a robotic agent, the control system comprising:
   a task controller to control the robotic agent in performing an assigned role of a task, wherein the task controller is configured to initiate performance by the robotic agent of the assigned role of the task and to report completion of the performance of the assigned role of the task by the robotic agent; and a status manager to communicate with the task controller and configured to:
  maintain status information for the robotic agent, wherein the status information for the robotic agent includes:
    a task state of the robotic agent representing a vote of the robotic agent for the task;
    one or more peer task states of one or more peer robotic agents representing one or more votes of the one or more peer robotic agents for the task; and
    a consensus task state representing a consensus vote for the task;
  determine the consensus task state based on whether the robotic agent is operating as a participating agent or a monitoring agent,
    wherein the task state of the robotic agent is considered when determining the consensus task state when the robotic agent is operating as the participating agent, and
    wherein the task state of the robotic agent is not considered when determining the consensus task state when the robotic agent is operating as the monitoring agent;
  determine whether to update the consensus task state to a next task state in response to an indication from a particular peer robotic agent of the one or more peer robotic agents that the particular peer robotic agent has voted to transition the consensus task state to the next task state;
  in response to determining to update the consensus task state to the next task state:
    update the consensus task state to the next task state; and
    when the robotic agent is operating as the monitoring agent, transition the robotic agent from operating as the monitoring agent to operating as the participating agent, wherein the robotic agent is to perform an action associated with a second task associated with the next task state;
  subscribe to status information for the second task from at least one peer robotic agent of the one or more peer robotic agents based on whether the task and the second task are interdependent.

2. The control system of claim 1, further comprising a peer to peer communications system to communicate with the status manager and to receive a first status message from at least one of the one or more peer robotic agents, the first status message including peer status information reported by one of the one or more peer robotic agents.

3. The control system of claim 2, wherein the status manager is further configured to update the status information of the robotic agent in response to a change of at least one of the task state of the robotic agent or the one or more peer task states, wherein the change is determined based on the peer status information included in the first status message.

4. The control system of claim 2, wherein the status manager is further configured to:
  evaluate version information included in the first status message to determine whether the first status message reports more current peer status information than the status information of the robotic agent before updating the status information of the robotic agent based on the first status message.

5. The control system of claim 2, wherein the peer to peer communications system is further configured to send a second status message to at least one of the one or more peer robotic agents in response to the status manager updating the status information of the robotic agent, the second status message including the status information stored at the robotic agent.

6. The control system of claim 1, wherein the consensus task state represents that a predetermined quantity of the robotic agent and the one or more peer robotic agents that are operating as participating agents agree on a same task status.

7. A method comprising:
  storing, at a first device of a plurality of devices:
    a first task state corresponding to the first device representing a vote of the first device for a task;
    other task states corresponding to other devices of the plurality of devices representing other votes of the other devices for the task; and
    a consensus task state representing a consensus vote for the task,
    wherein the first task state and the other task states are associated with the task, the task to be performed by one or more devices of the plurality of devices;
  determining the consensus task state based on whether the first device is operating as a participating agent or a monitoring agent,
    wherein the task state of the first device is considered when determining the consensus task state when the first device is operating as the participating agent, and
    wherein the task state of the first device is not considered when determining the consensus task state when the first device is operating as the monitoring agent;
  determining whether to update the consensus task state to a next task state in response to an indication from a particular device of the plurality of devices that the particular device has voted to transition the consensus task state to the next task state;
  in response to determining to update the consensus task state to the next task state:
    updating, at the first device, the consensus task state to the next task state; and
    when the first device is operating as the monitoring agent, transitioning the first device from operating as the monitoring agent to operating as the participating agent, wherein the first device is to perform an action associated with a second task associated with the next task state; and
  subscribing to status information for the second task from at least one device of the other devices based on whether the task and the second task are interdependent.

8. The method of claim 7, further comprising transmitting a message from the first device to the other devices in response to determining a change in at least one of the first task state, one or more of the other tasks states, or the consensus task state, wherein the message indicates the determined change, and wherein the message is transmitted when the first device is operating as a participating agent.

9. The method of claim 8, wherein the message is transmitted via peer-to-peer communication.

10. The method of claim 9, wherein the message is transmitted using optimistic replication.

11. The method of claim 7, further comprising transmitting a message from the first device to each of the other devices in response to determining a change in at least one of the one or more of the other tasks states or the consensus task state, wherein the message indicates the determined change, and wherein the message is transmitted when the first device is operating as a monitoring agent.

12. The method of claim 7, wherein determining whether to update the consensus task state to the next task state comprises:

updating, at the first device, a particular task state to the next task state, wherein the particular task state corresponds to the particular device; and redetermining the consensus task state, wherein redetermining the consensus task state comprises determining whether a predetermined quantity of the plurality of devices agree on the next task state.

13. A non-transitory computer-readable storage medium comprising instructions that, when executed by a processor, cause the processor to:

store, at a first device of a plurality of devices:
- a first task state corresponding to the first device representing a vote of the first device for a task;
- task states corresponding to other devices of the plurality of devices representing other votes of the other devices for the task; and
- a consensus task state representing a consensus vote for the task,
- wherein the first task state and the task states are associated with the task, the task to be performed by one or more devices of the plurality of devices;

determine the consensus task state based on whether the first device is operating as a participating agent or a monitoring agent,
- wherein the first task state is considered when determining the consensus task state when the first device is operating as the participating agent, and
- wherein the first task state is not considered when determining the consensus task state when the first device is operating as the monitoring agent;

determine whether to update the consensus task state to a next task state in response to an indication from a particular device of the plurality of devices that the particular device has voted to transition the consensus task state to the next task state;

in response to determining to update the consensus task state to a the next task state:
- update, at the first device, the consensus task state to the next task state; and
- when the first device is operating as the monitoring agent, transitioning the first device from operating as the monitoring agent to operating as the participating agent, wherein the first device is to perform an action associated with a second task associated with the next task state; and subscribe to status information for the second task from at least one device of the other devices based on whether the task and the second task are interdependent.

14. The non-transitory computer-readable storage medium of claim 13, further comprising instructions that, when executed by the processor, cause the processor to:
- update the first task state in response to a determination that execution of a portion of the task to be performed by the one or more devices is complete; and
- transmit, from the first device to each of the other devices, a message that indicates the updated first task state.

15. The non-transitory computer-readable storage medium of claim 14, wherein the message includes the updated first task state, the task states, and the consensus task state.

16. The non-transitory computer-readable storage medium of claim 13, further comprising instructions that, when executed by the processor, cause the processor to:
- receive a second message from a second device of the plurality of devices, wherein the second device stores task state information for each device operating as a participating agent, and wherein the second message includes the task state information stored at the second device;
- update at least one of the task states corresponding to at least one of the other devices based on the task state information included in the second message; and
- send a third message to one or more of the other devices that includes the updated task states.

17. The non-transitory computer-readable storage medium of claim 16, further comprising instructions that, when executed by the processor, cause the processor to determine whether to update the consensus task state in response to receiving the second message.

18. The non-transitory computer-readable storage medium of claim 17, wherein the second message includes version information.

19. The non-transitory computer-readable storage medium of claim 18, further comprising instructions that, when executed by the processor, cause the processor to determine whether to update at least one of the task states corresponding to at least one of the other devices based on the version information included in the second message, wherein the first device updates at least one of the task states when the version information indicates that the task state information stored at the second device is more recent than the task states stored at the first device.

* * * * *